(12) United States Patent
Kuboki et al.

(10) Patent No.: US 10,714,798 B2
(45) Date of Patent: Jul. 14, 2020

(54) COOLING MEMBER AND POWER STORAGE MODULE WITH SAME

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Hideyuki Kuboki, Yokkaichi (JP); Hiroki Hirai, Yokkaichi (JP); Makoto Higashikozono, Yokkaichi (JP); Hisashi Sawada, Yokkaichi (JP); Akihisa Hosoe, Osaka (JP); Tomoharu Takeyama, Osaka (JP); Yoshiyuki Hirose, Osaka (JP); Akihiro Nagafuchi, Osaka (JP); Eiichi Kobayashi, Osaka (JP)

(73) Assignees: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 185 days.

(21) Appl. No.: 15/759,580

(22) PCT Filed: Aug. 23, 2016

(86) PCT No.: PCT/JP2016/074469
§ 371 (c)(1),
(2) Date: Mar. 13, 2018

(87) PCT Pub. No.: WO2017/051648
PCT Pub. Date: Mar. 30, 2017

(65) Prior Publication Data
US 2019/0165436 A1 May 30, 2019

(30) Foreign Application Priority Data

Sep. 24, 2015 (JP) .................. 2015-187107
Dec. 2, 2015 (JP) .................. 2015-235678
Jun. 15, 2016 (JP) .................. 2016-119194

(51) Int. Cl.
*H01M 10/659* (2014.01)
*H01M 10/613* (2014.01)
(Continued)

(52) U.S. Cl.
CPC ....... *H01M 10/659* (2015.04); *H01M 10/613* (2015.04); *H01M 10/647* (2015.04);
(Continued)

(58) Field of Classification Search
None
See application file for complete search history.

(56) References Cited

U.S. PATENT DOCUMENTS 7,968,223 B2  6/2011 Lee et al.
2003/0014982 A1* 1/2003 Smith .................. C09K 5/047
62/106

(Continued)

FOREIGN PATENT DOCUMENTS

CN  103715472 A    4/2014
JP  07066575 A  *  3/1995
(Continued)

OTHER PUBLICATIONS

English Translation of International Preliminary Report on Patenability for Application No. PCT/JP2016/074469; 2 pages, dated Jan. 2015.

(Continued)

*Primary Examiner* — Tracy M Dove
(74) *Attorney, Agent, or Firm* — Reising Ethington, P.C.

(57) ABSTRACT

A cooling member includes a sealing member including a first sheet member and a second sheet member connected to each other in a liquid-tightly closed state, a refrigerant (Continued)

enclosed in the sealing member, and an absorbing member disposed in the sealing member and configured to absorb the refrigerant.

17 Claims, 39 Drawing Sheets

(51) Int. Cl.
  *H01M 10/6552* (2014.01)
  *H01M 10/647* (2014.01)
  *H01M 10/6555* (2014.01)
  *H01M 10/6567* (2014.01)
  *H01M 10/617* (2014.01)

(52) U.S. Cl.
  CPC ... *H01M 10/6552* (2015.04); *H01M 10/6555* (2015.04); *H01M 10/6567* (2015.04); *H01M 10/617* (2015.04)

(56) References Cited

U.S. PATENT DOCUMENTS

| 2006/0216582 | A1 | 9/2006 | Lee et al. |
| 2010/0300654 | A1 | 12/2010 | Edwards |

FOREIGN PATENT DOCUMENTS

| JP | H0766575 A | 3/1995 |
| JP | H1123169 A | 1/1999 |
| JP | 2006278327 A | 10/2006 |
| JP | 2010211963 A | 9/2010 |
| JP | 2013157111 A | 8/2013 |

OTHER PUBLICATIONS

English Translation of the Written Opinion of the International Search Authority for Application No. PCT/JP2016/074469; 3 pages, dated Jan. 2015.

International Preliminary Report on Patenability for Application No. PCT/JP2016/074469; 12 pages, dated Nov. 8, 2016.

International Search Report for Application No. PCT/JP2016/074469; 8 pages, dated May 30, 2017.

\* cited by examiner

COOLING MEMBER AND POWER STORAGE MODULE WITH SAME

CROSS REFERENCE TO RELATED APPLICATIONS

This application claims the priority of Japanese patent application JP2015-187107 filed on Sep. 24, 2015, JP2015-235678 filed on Dec. 2, 2015 and JP2016-119194 filed on Jun. 15, 2016, the entire contents of all of these applications are incorporated herein by reference.

TECHNICAL FIELD

The technology described herein relates to a cooling member and a power storage module including the same.

BACKGROUND ART

A heat pipe, such as a heat pipe described in Patent Document 1 (JPH11-23169), has been widely known. In the heat pipe, a heat transfer fluid is enclosed in a liquid-tightly closed metal pipe.

In the above-described configuration, the pipe needs to have high strength to enclose the heat transfer fluid. The volume of the heat transfer fluid increases when the heat transfer fluid is vaporized by the heat from a heat source, increasing the pressure in the pipe. The employment of the pipe that is configured to enclose a heat transfer fluid in a liquid-tightly closed state and has a relatively high strength requires a higher production cost.

SUMMARY

The technology disclosed herein has been developed to solve the above-described problem, and an object thereof is to provide a cooling member that is produced at a lower cost and to provide a power storage module including the same.

The technology described herein provides a cooling member including a sealing member composed of a sheet member including a metal sheet and connected in a liquid-tightly closed state, a refrigerant enclosed in the sealing member, and an absorbing member disposed in the sealing member and configured to absorb the refrigerant.

With the above-described configuration, the pressure in the sealing member increases when the refrigerant vaporizes. This deforms the sheet member to increase the inner volume of the sealing member. This lowers the pressure in the sealing member. Thus, compared with a cooling member composed of a metal container whose inner volume does not change, the sealing member requires lower pressure resistance. This reduces the production cost of the cooling member.

The following aspects are preferable as embodiments of the present configuration.

The sealing member preferably includes an expansion portion at a side end thereof. The expansion portion is preferably composed of a side end of the sheet member bent toward an inner side of the sealing member and is configured to be expanded by vaporization of the refrigerant to increase an inner volume of the sealing member.

With the above-described configuration, the pressure in the sealing member is further lowered by the expansion of the expansion portion when the pressure in the sealing member is increased by vaporization of the refrigerant. This further reduces the production cost of the cooling member.

The sealing member preferably includes a contact portion to be in contact with a heat source, and the expansion portion is preferably disposed in an area of the sealing member at least away from the contact portion.

With the above-described configuration, the refrigerant vaporized at the contact portion by heat transferred from the heat source moves to the expansion portion and is cooled at the expansion portion to condense into a liquid. At this time, the heat is dissipated to the outside of the sealing member. In this way, the heat from the heat source is reliably received at the contact portion, and the received heat is reliably dissipated at the expansion portion.

The absorbing member preferably includes a concavity and a convexity defining a passage of the refrigerant in an outer surface thereof.

With the above-described configuration, traveling of the refrigerant through the passage facilitates circulation of the refrigerant, improving the cooling performance.

In the absorbing member, a density of an area having the passage may preferably be different from that of other areas.

With the above-described configuration, the passage of the refrigerant is formed by changing the density of portions of the absorbing member, simplifying the production process.

The sealing member preferably includes a contact portion to be in contact with a heat source, and the passage preferably extends from an area of the absorbing member overlapping the contact portion toward an area not overlapping the contact portion.

The above-described configuration allows the refrigerant to readily move to the area of the absorbing member not overlapping the contact portion, improving heat dissipation properties.

The sealing member preferably includes a contact portion to be in contact with a heat source, and the absorbing member is preferably disposed in the sealing member over an area equal to or larger than the contact portion of the sealing member.

With the above-described configuration, the heat at the contact portion transferred from the heat source is reliably transferred to the absorbing member. Since the absorbing member contains the refrigerant, the heat from the heat source functions as heat of vaporization used for vaporization of the refrigerant. Thus, the heat source is reliably cooled.

The sheet member preferably includes a resin layer having laminated resin. The sheet member preferably includes two sheet members thermally bonded to each other with the resin layer on an inner side. The sheet members are preferably exposed at an outer surface of the sealing member.

With the above-described configuration, the heat is dissipated to the outside of the sealing member through the sheet member exposed on the outer surface of the sealing member, improving the heat dissipation properties compared with a configuration having resin further on the outer surface of the sheet member.

The absorbing member preferably allows the refrigerant to move up in the absorbing member such that a height between an uppermost position of the refrigerant determined after an end of the absorbing member arranged in a vertical position is immersed in the refrigerant for 60 seconds and a surface of the refrigerant is 5 mm or more.

With the above-described configuration, the refrigerant is more reliably absorbed, improving the cooling performance of the cooling member.

The sheet member preferably includes a metal sheet.

With the above-described configuration, since metal has relatively high thermal conductivity, the heat of the heat source is quickly transferred to the sheet member and quickly transferred through the sheet member to the inner side of the sealing member. The heat is cooled by the refrigerant in the sealing member. This improves the cooling performance of the cooling member.

The technology disclosed herein provides a power storage module including the above-described cooling member, a case housing the cooling member, and a power storage element housed in the case and being in contact with the cooling member at at least a portion of an outer surface thereof.

With the above-described configuration, the heat generated at the power storage element is absorbed by the cooling member in contact with one portion of the outer surface of the power storage element. Since the cooling member is liquid-tightly closed and the refrigerant is enclosed in the liquid-tightly closed cooling member, the case of the power storage module does not need to be liquid-tightly closed. Thus, the production cost of the power storage element is lowered.

A power storage module includes the above-described cooling member, a case housing the cooling member, and a power storage element housed in the case and being in contact with the cooling member at at least a portion of an outer surface thereof. A positive electrode terminal and a negative electrode terminal protrude from the power storage element. The passage preferably extends toward at least one of the positive electrode terminal and the negative electrode terminal.

A power storage module includes the above-described cooling member, a case housing the cooling member, and a power storage element housed in the case and being contact with the cooling member at at least a portion of an outer surface thereof. A positive electrode terminal and a negative electrode terminal protrude from an oblong body of the power storage element beyond an outer periphery thereof. The passage extends from a position adjacent to one of four sides of the body, from which at least one of the positive electrode terminal and the negative electrode terminal does not protrude, toward another one of the four sides.

A heat dissipation member for releasing heat of a power storage element may be disposed near the body of the power storage element. In such a case, the heat dissipation member may be disposed near one of four sides of the body from which at least one of the positive electrode terminal and the negative electrode terminal does not protrude. This is reasonable because the positive electrode terminal and the negative electrode terminal do not prevent placement of the heat dissipation member. In this case, of four sides of the body, the passage in the absorbing member extending from one side, from which at least one of the positive electrode terminal and the negative electrode terminal does not protrude, toward another side allows the heat of the power storage element to be readily transferred to the heat dissipation member through the refrigerant traveling through the passage, improving the heat dissipation properties.

A power storage module preferably includes the above-described cooling member, a case housing the cooling member, and a power storage element housed in the case and being in contact with the cooling member at at least a portion of an outer surface thereof. A positive electrode terminal and a negative electrode terminal protrude from the power storage element. An area of the absorbing member near at least one of the positive electrode terminal and the negative electrode terminal is preferably formed of a material different from a material forming other areas of the absorbing member.

With the above-described configuration, since the area near the positive electrode terminal or the negative electrode terminal where the temperature is likely to increase is formed of a different material, the cooling performance is improved by selecting a material as necessary.

The technology described herein reduces the production cost of the cooling member or the power storage element.

FIRST EMBODIMENT

Figure 1:
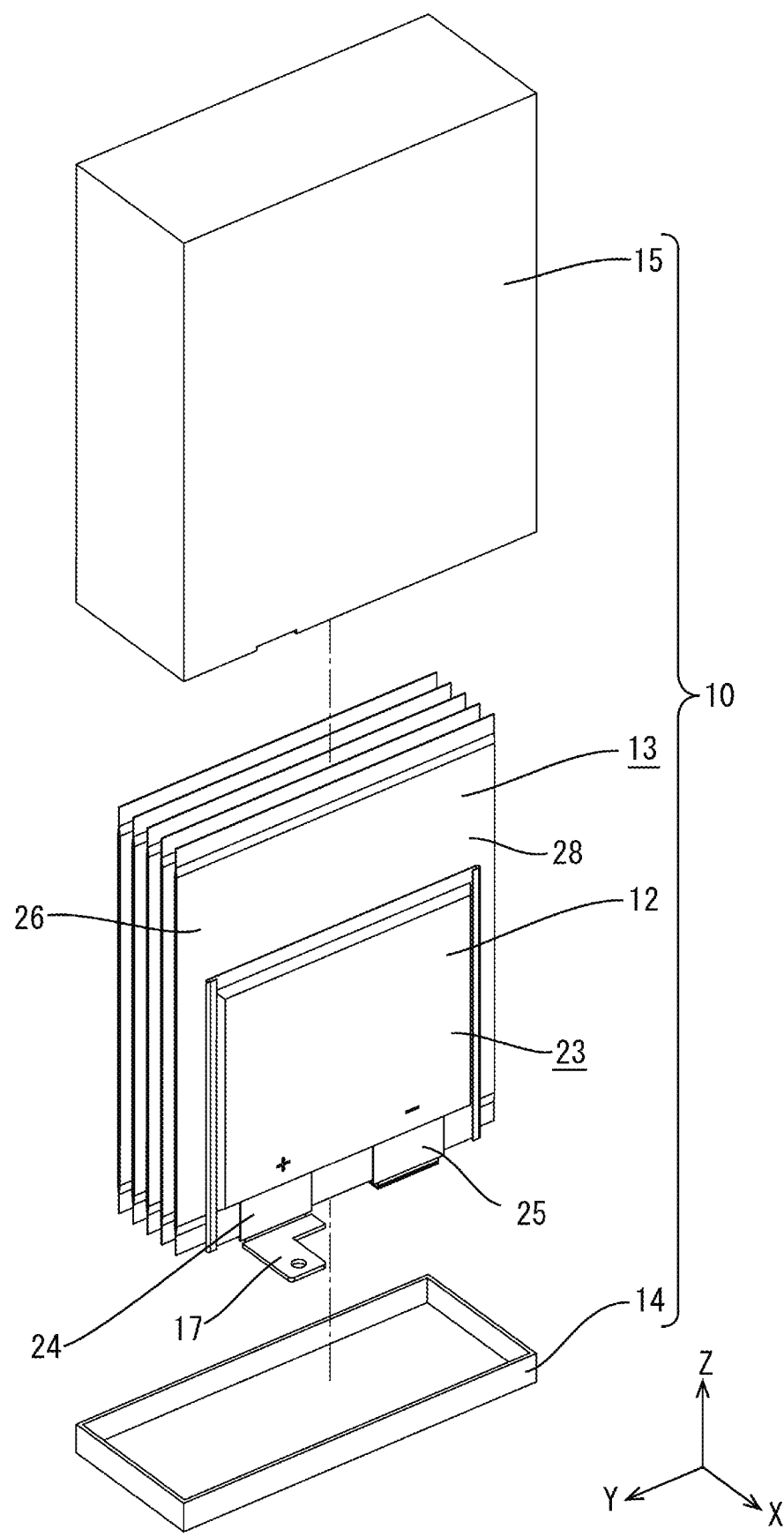
FIG. 1 is an exploded perspective view illustrating a power storage module according to a first embodiment.

A first embodiment of the technology described herein is described with reference to FIGS. 1 to 9. A power storage module 10 according to the embodiment includes a case 11, a power storage element 12 (one example of a heat source) housed in the case 11, and a cooling member 13 housed in the case 11 and being in contact with a portion of an outer surface of the power storage element 12. In the following description, an X direction indicates a right side, an Y direction indicates a front side, and a Z direction indicates an upper side. Components having the identical shape have the same reference numeral, and some of the components are illustrated without the reference numeral.

Figure 2:
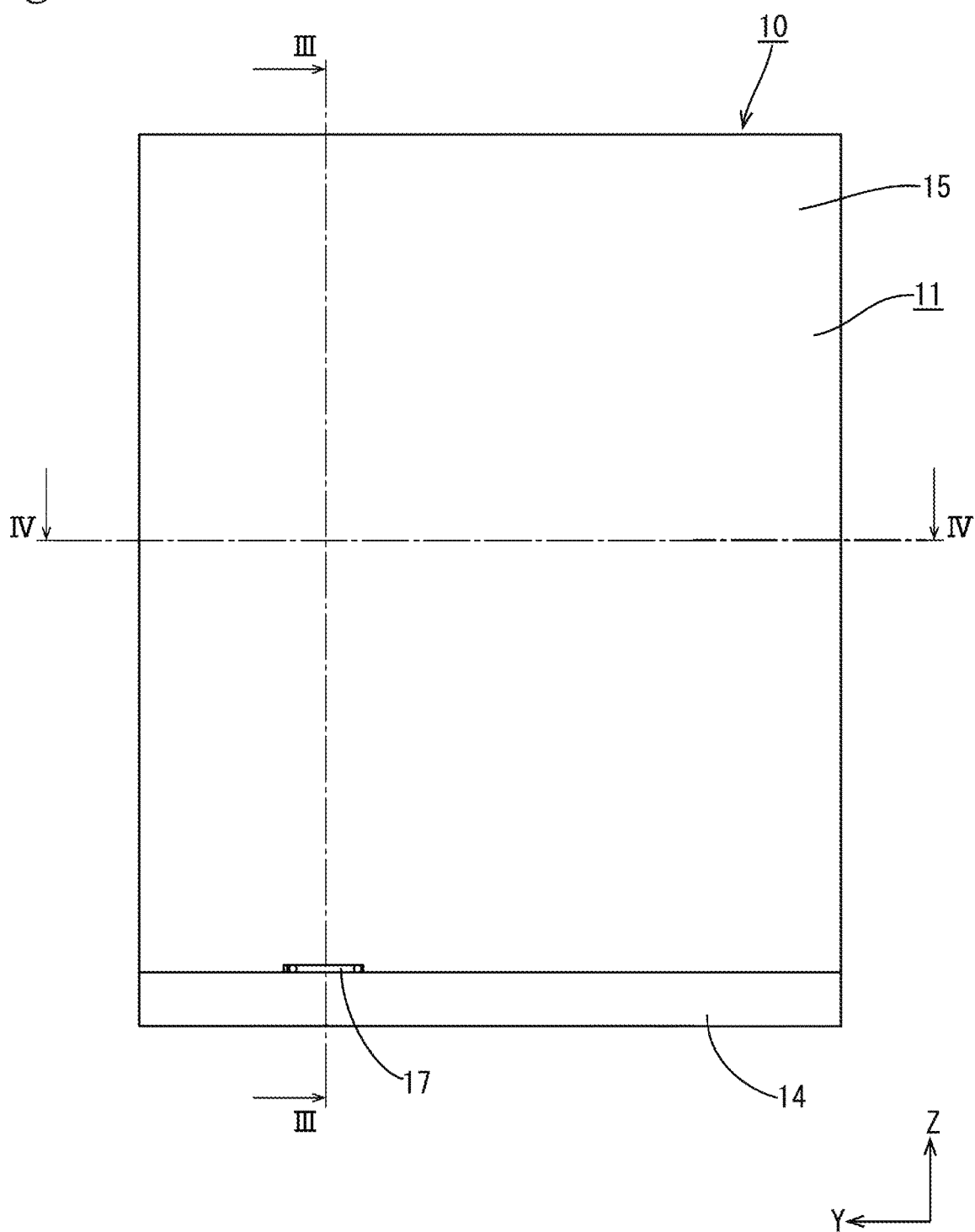
FIG. 2 is a side view illustrating the power storage module.

As illustrated in FIG. 2, the case 11 has a substantially cuboidal overall shape. As illustrated in FIG. 1, the case 11 includes a lower case 14 and a box-like upper case 15 attached to an upper portion of the lower case 14. The lower case 14 has an upper opening and has a substantially oblong shape when seen from the upper side. The upper case 15 has a substantially oblong shape in cross section and has a lower opening. The upper case 15 has a lower edge shaped in conformance with the upper edge of the lower case 14.

The lower case 14 and the upper case 15 may be formed of any material, such as a synthetic resin and a metal. The lower case 14 and the upper case 15 may be formed of different materials or the same material.

The lower case 14 and the upper case 15 are assembled together by any known method, such as a locking structure including a locking member and a locked member, a screw fastening structure, and bonding with an adhesive. A lower case 14 and an upper case 15 formed of metal may be connected to each other by any known method, such as laser welding and brazing. In this embodiment, the lower case 14 and the upper case 15 are assembled together in a non-liquid-tightly closed state. The lower case 14 and the upper case 15 may be assembled together in a liquid-tightly closed state.

Figure 3:
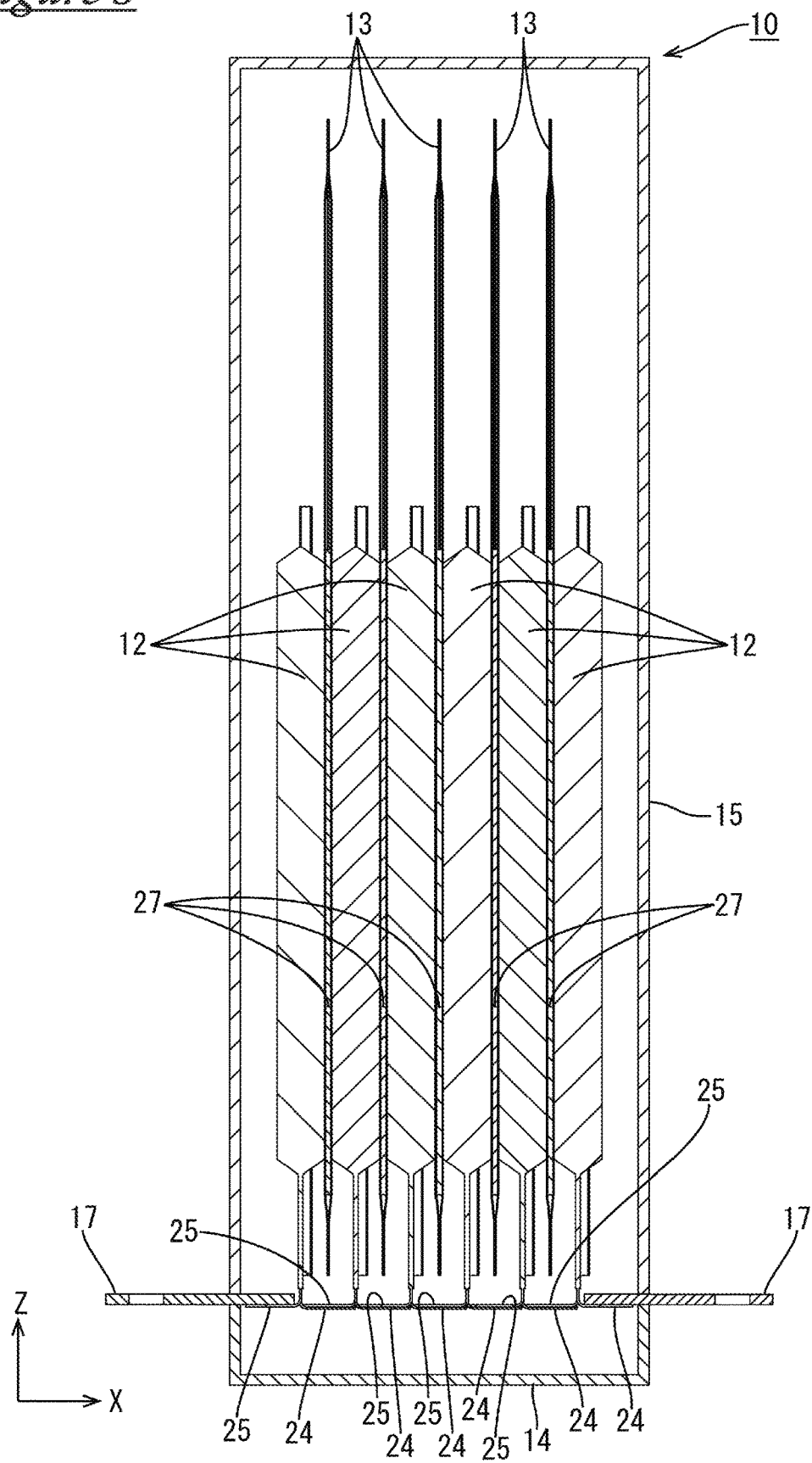
FIG. 3 is a cross-sectional view taken along line in FIG. 2.

As illustrated in FIGS. 2 and 3, a pair of power terminals 17 protruding to the left and right sides is disposed in the case 11 at a position adjacent to the lower front end. The power terminals 17 are formed of metal plates.

Figure 4:
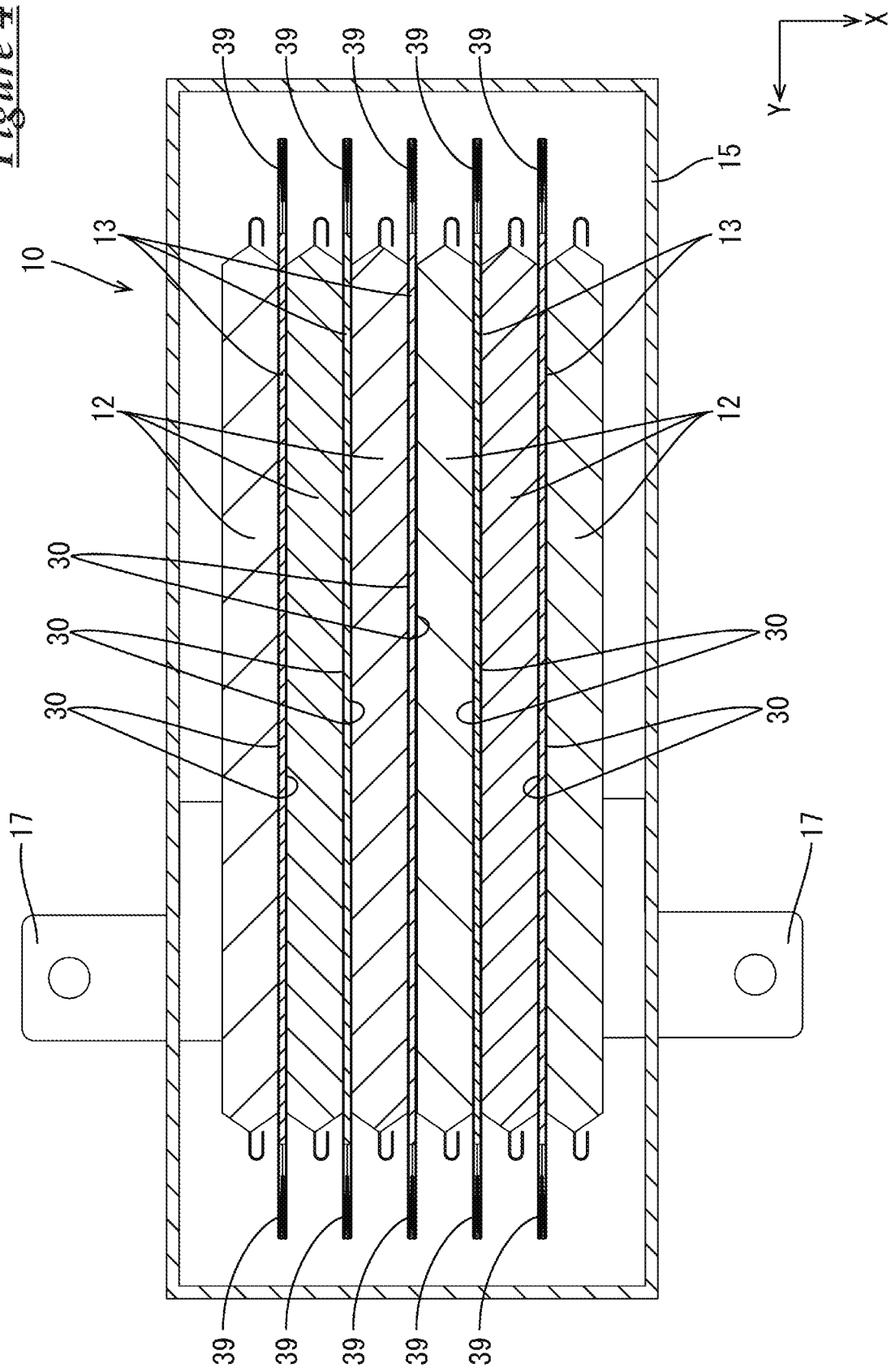
FIG. 4 is a cross-sectional view taken along line IV-IV in FIG. 2.
Figure 5:
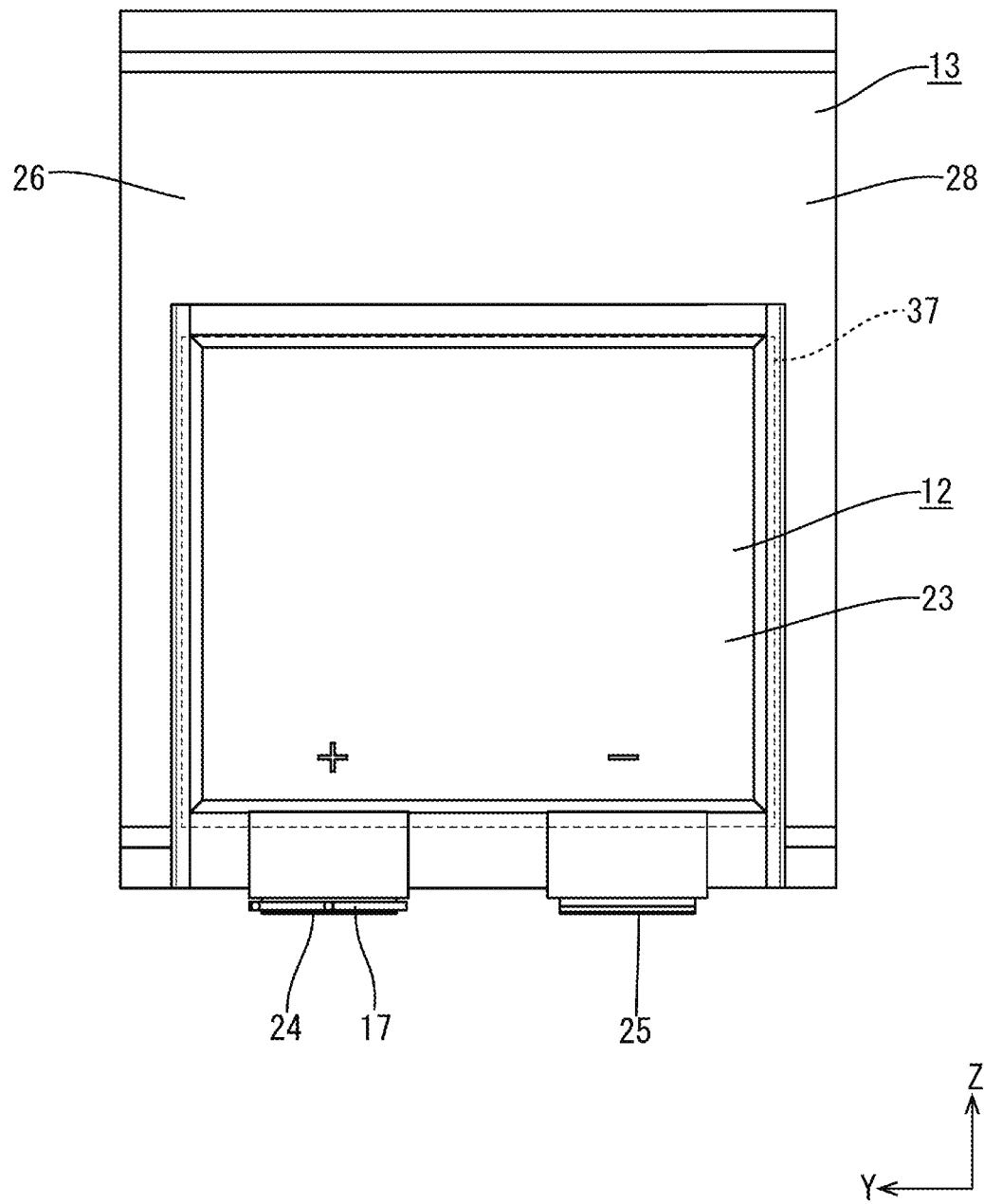
FIG. 5 is a side view illustrating the power storage element and a cooling member.

As illustrated in FIG. 3 to FIG. 5, the power storage element 12 includes two battery laminate sheets 23 having a power storage component (not illustrated) therebetween. The battery laminate sheets 23 are connected to each other in a liquid-tightly closed state at the side ends by a known method, such as thermal welding. As illustrated in FIG. 3, a positive electrode terminal 24 and a negative electrode terminal 25, which are metal foils, protrude from the lower edge of the power storage element 12 outwardly from the battery laminate sheets 23 while being in contact with the inner surfaces of the battery laminate sheets 23 in a liquid-tightly closed state. The positive electrode terminal 24 and the negative electrode terminal 25 are arranged with a distance in the front-back direction. The positive electrode terminal 24 and the negative electrode terminal 25 are each electrically connected to the power storage component.

As illustrated in FIG. 3 and FIG. 4, the power storage elements 12 (six power storage elements 12 in this embodiment) are arranged in the left-right direction. The power storage elements 12 adjacent to each other in the left-right direction are arranged such that the positive electrode terminal 24 of one of the power storage elements 12 is adjacent to the negative electrode terminal 25 of another one of the power storage elements 12 and the negative electrode terminal 25 of one of the power storage elements 12 is adjacent to the positive electrode terminal of another one of the power storage elements 12. The positive electrode terminal 24 and the negative electrode terminal 25 positioned next to each other are bent toward each other. The positive electrode terminal 24 and the negative electrode terminal 25 placed on each other in the up-down direction are electrically connected to each other by a known method, such as laser welding, welding for ultrasonic, and brazing. The power storage elements 12 are connected in series.

In this embodiment, the power storage element 12 may be a secondary battery, such as a lithium-ion rechargeable battery and a nickel-metal hydride rechargeable battery. Alternatively, the power storage element 12 may be a capacitor, such as an electric double-layer capacitor and a lithium-ion capacitor. A power storage element 12 of any type may be suitably employed as appropriate.

As illustrated in FIG. 3, the cooling member 13 includes a liquid-tightly closed sealing member 26 enclosing a refrigerant 27. The amount of the refrigerant 27 held in the sealing member 26 is suitably determined as appropriate. The refrigerant 27 may be one or two or more selected from the group consisting of a perfluorocarbon, a hydrofluoroether, a hydrofluorinated ketone, a fluorine inert liquid, water, and alcohol such as methanol and ethanol. The refrigerant 27 may have insulating properties or conductive properties. The dimension of the cooling member 13 in the up-down direction is larger than that of the power storage element 12.

Figure 6:
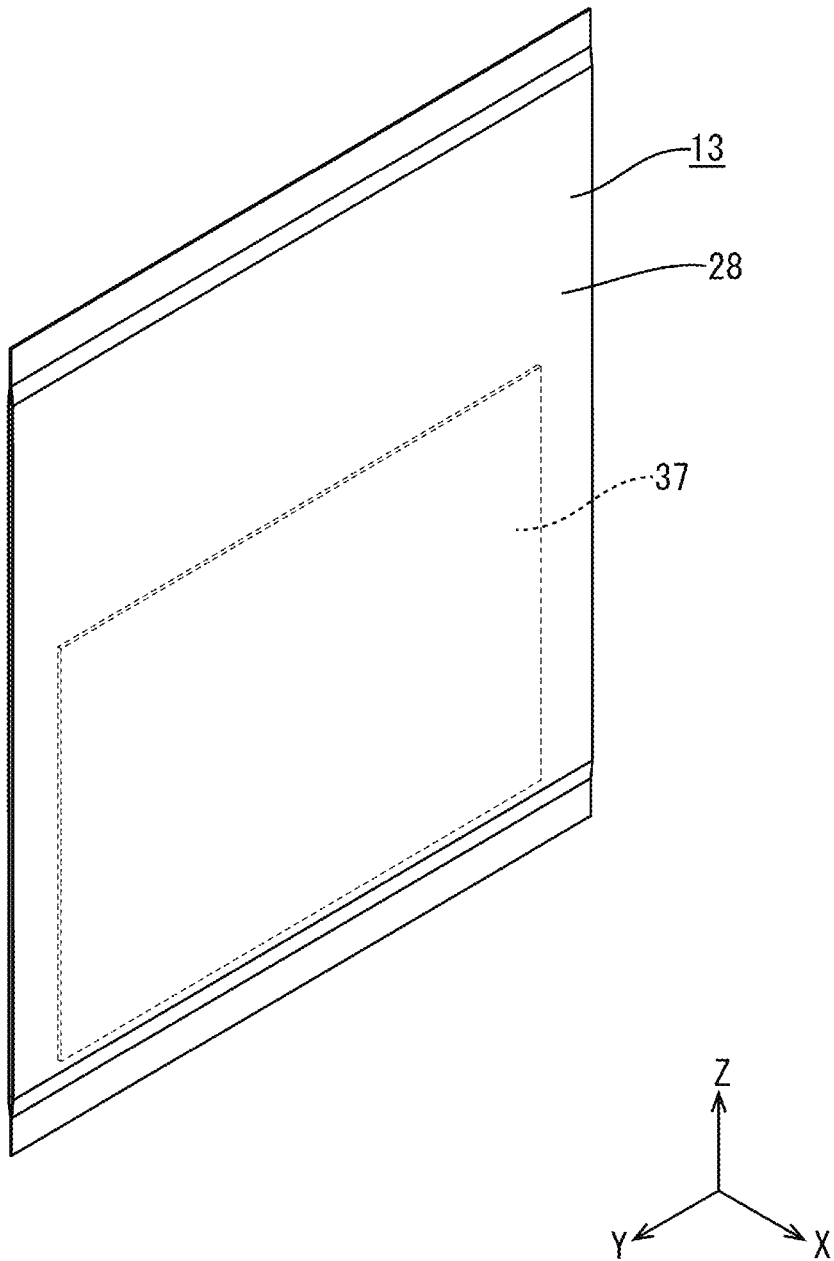
FIG. 6 is a perspective view illustrating the cooling member.
Figure 7:
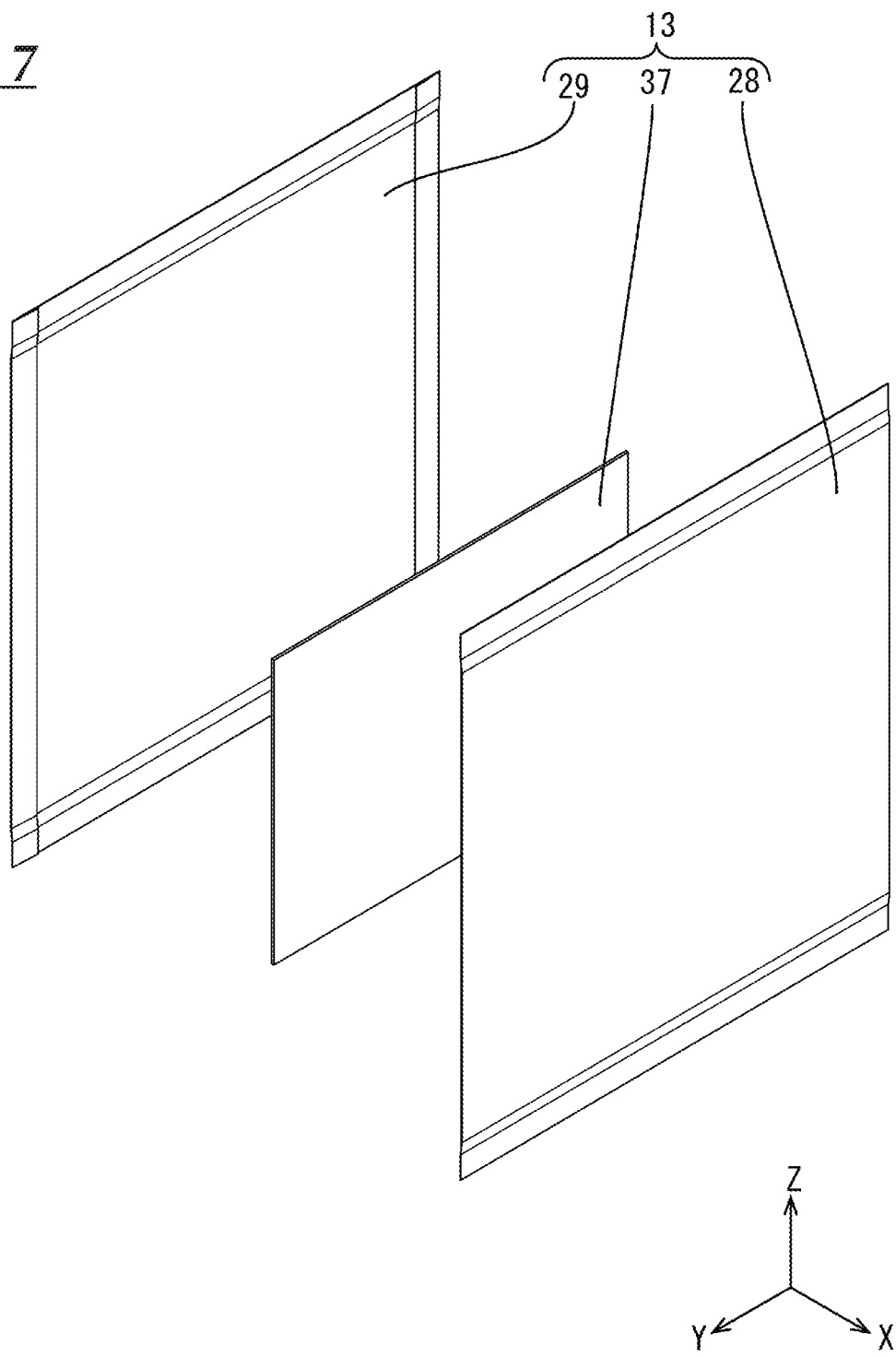
FIG. 7 is an exploded perspective view illustrating the cooling member.

As illustrated in FIGS. 6 and 7, the sealing member 26 includes substantially oblong first and second sheet members 28 and 29 connected to each other in a liquid-tightly closed state by a known method, such as bonding and welding.

The first and second sheet members 28 and 29 each include a metal sheet and synthetic resin films laminated on surfaces of the metal sheet. Any metal may be suitably employed to form the metal sheet, and examples thereof include aluminum, an aluminum alloy, copper, and a copper alloy. Any synthetic resin may be suitably employed to form the synthetic resin film, and examples thereof include polyolefins such as polyethylene and polypropylene and polyesters such as polybutylene terephthalate and polyethylene terephthalate, and polyamides such as nylon 6 and nylon 6,6.

The sealing member 26 according to the embodiment is obtained by thermal bonding of the first sheet member 28 and the second sheet member 29 to each other with the surfaces thereof having the synthetic resin film thereon being overlapped with each other.

As illustrated in FIGS. 3 and 4, the outer surface of the sealing member 26 has a contact portion 30 in contact with the power storage element 12.

As illustrated in FIGS. 6 and 7, an absorbing member 37 is disposed in the sealing member 26. The absorbing member 37 is a substantially oblong sheet.

The absorbing member 37 is formed of a material capable of absorbing the refrigerant 27. The absorbing member 37 may be a woven fabric or a nonwoven fabric formed of a material in a fibrous form capable of absorbing the refrigerant 27. The nonwoven fabric may be in the form of sheet, web (a thin sheet composed only of fibers), or batting (blanket fibers). The material of the absorbing member 37 may be a natural fiber, or a synthetic fiber formed of a synthetic resin, or a combination thereof.

Alternatively, rock wool or glass wool, which is inorganic fibers may compose the material of the absorbing member 37. The use of the rock wool or the glass wool improves heat resistance and pressure resistance of the material and also provides the material with a fire spreading prevention function at the time of ignition of battery. The material of the absorbing member 37 may be glass cloth, which is a woven fabric formed of glass fibers.

The material of the absorbing member 37 is preferably a material that allows the refrigerant 27 to move up in the absorbing member 37 such that the height between the uppermost position of the refrigerant 27 determined after the lower end of the vertically-positioned absorbing member 37 is immersed in the refrigerant 27 for 60 seconds and the surface of the refrigerant 27 is 5 mm or more. This enables the refrigerant 27 to be more reliably absorbed, improving the cooling performance of the cooling member 13.

The absorbing member 37 is disposed in the sealing member 26 over an area equal to or larger than the contact portion 30 of the sealing member 26. As illustrated in FIG. 5, in this embodiment, the absorbing member 37 is disposed in the sealing member 26 over an area slightly larger than the contact portion 30.

Figure 8:
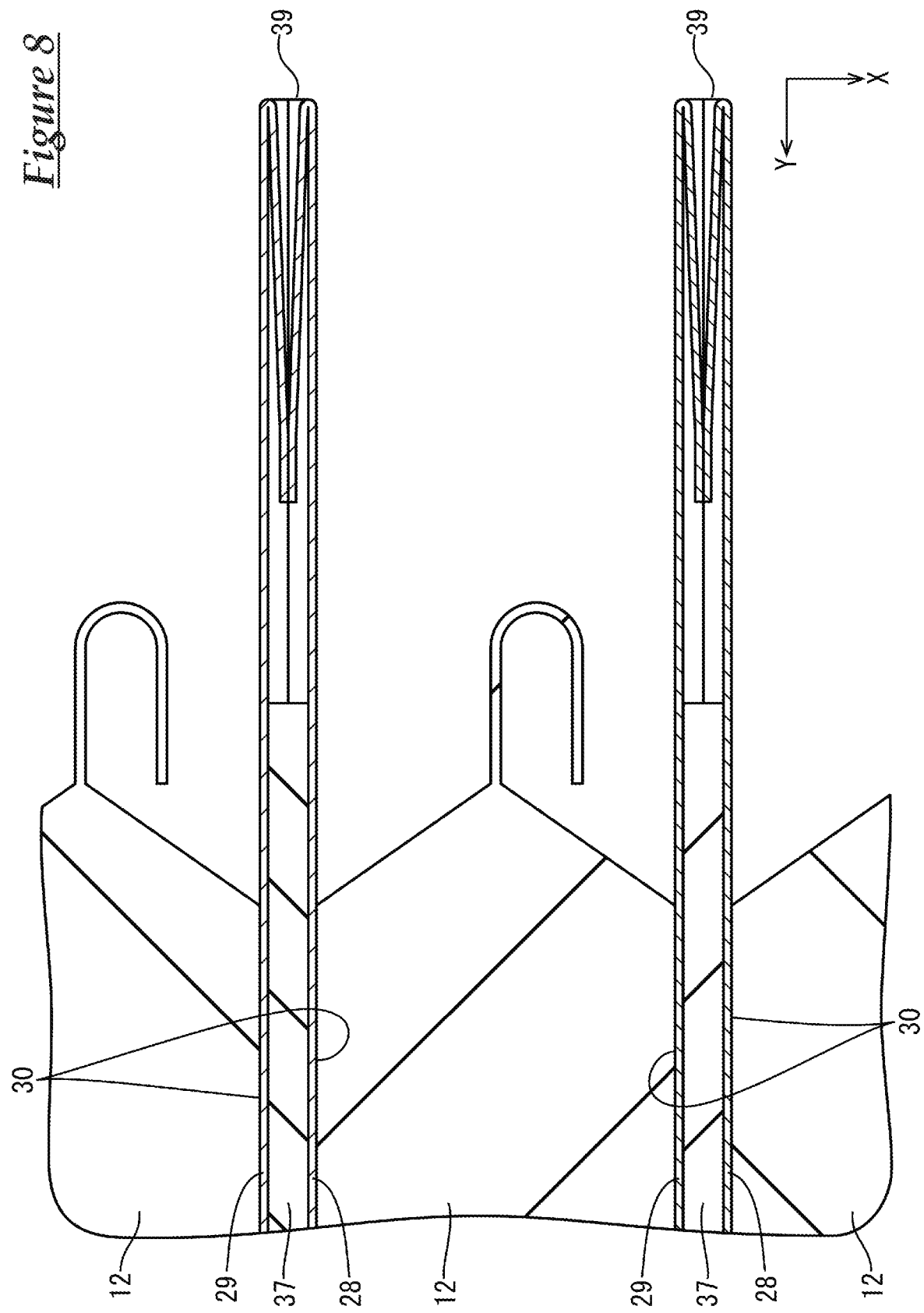
FIG. 8 is a partly-magnified cross-sectional view illustrating an expansion portion.

As illustrated in FIG. 8, expansion portions 39 at the front and rear ends of the second sheet member 29 are each bent toward the inner side of the sealing member 26 with the first sheet member 28 and the second sheet member 29 being connected to each other. The expansion portion 39 expands in the left-right direction when the pressure inside the sealing member 26 is increased by the refrigerant 27 vaporized into gas. This increases the inner volume of the sealing member 26, decreasing the inner pressure of the sealing member 26. Thus, a lower physical strength is required to the sealing member 26.

Figure 9:
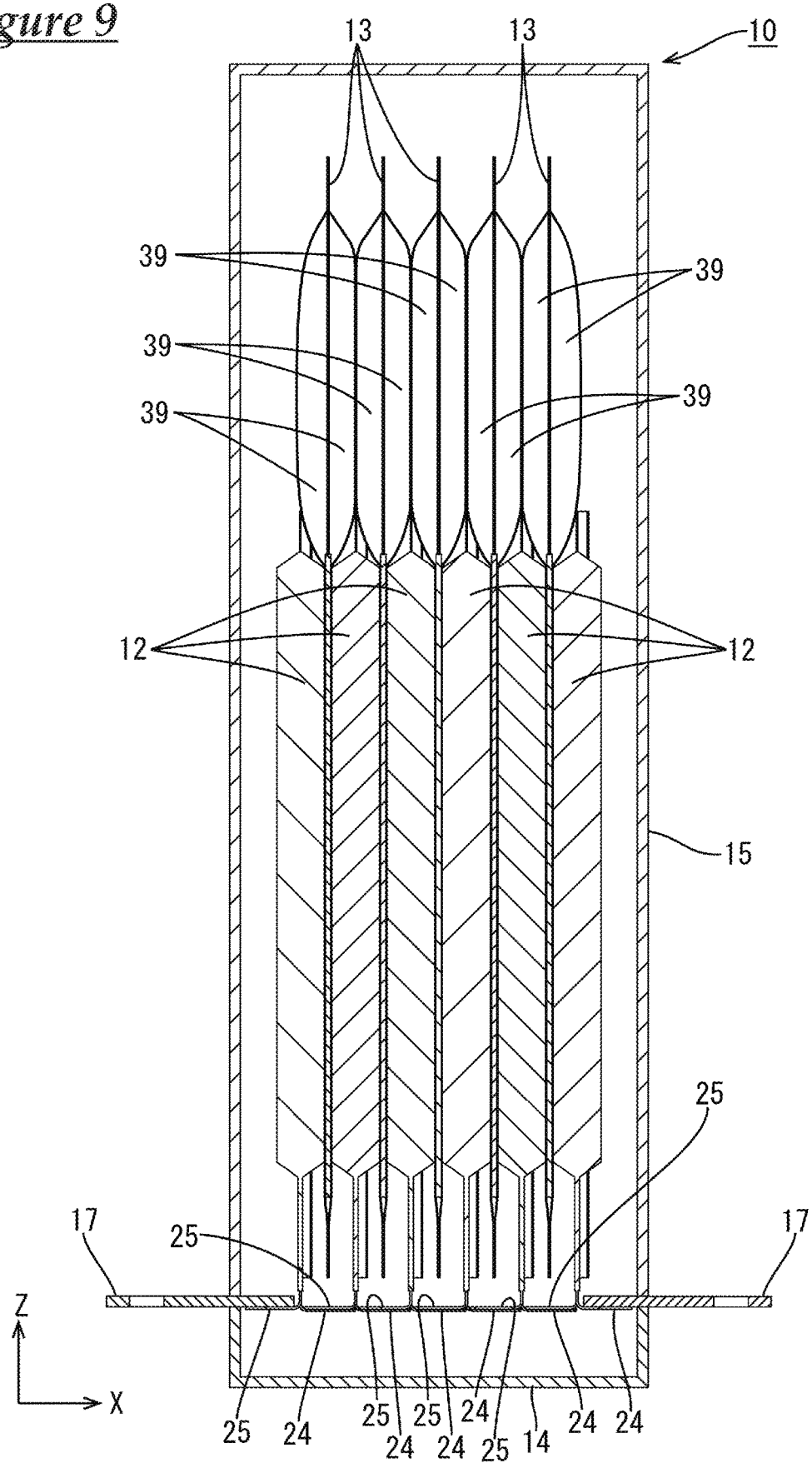
FIG. 9 is a cross-sectional view illustrating the expansion portion in an expanded state.

In particular, as illustrated in FIG. 9, in the cooling member 13, the expansion portion 39 located above the power storage element 12 is expanded in the left-right direction to increase the inner volume of the sealing member 26.

In other words, the expansion portion 39 is located at least away from the contact portion 30 of the sealing member 26. This allows the expansion portion 39 to expand with the contact between the contact portion 30 and the power storage element 12 being maintained. Thus, the refrigerant 27 is sufficiently vaporized since the expansion portion 39 expands with the heat transfer route from the power storage element 12 to the refrigerant 27 through the sealing member 26 and the absorbing member 37 being maintained. Thus, the heat of the power storage element 12 is transferred to the vapor of the refrigerant 27 due to the heat of vaporization of the refrigerant 27.

Next, effects and advantages of the embodiment are described. The cooling member 13 according to the embodiment includes the sealing member 26 including the first sheet member 28 and the second sheet member 29 each including a metal sheet and connected to each other in a liquid-tightly closed state, the refrigerant 27 enclosed in the sealing member 26, and the absorbing member 37 disposed in the sealing member 26 and configured to absorb the refrigerant 27.

In this embodiment, the refrigerant 27 vaporized into gas increases the pressure inside the sealing member 26. This changes the shapes of the first and second sheet members 28 and 29 to increase the inner volume of the sealing member 26. This lowers the pressure in the sealing member 26. Thus, the pressure resistance required to the sealing member 26 is smaller than that required to a sealing member of a cooling member formed of a metal container not capable of changing the inner volume. This reduces the production cost of the cooling member 13.

In this embodiment, the absorbing member 37 configured to absorb the refrigerant 27 is disposed in the sealing member 26. With this configuration, the refrigerant 27 is absorbed and held by the absorbing member 37, and thus the refrigerant 27 is evenly distributed over the area where the absorbing member 37 is located. This reduces unevenness in the cooling efficiency of the cooling member 13.

Furthermore, in the embodiment, the expansion portions 39 are disposed at the side ends of the sealing member 26. The expansion portions 39 are composed of side ends of the first and second sheet members 28 and 29 bent toward the inner side of the sealing member 26. The expansion portion 39 is configured to be expanded by vaporization of the refrigerant 27 to increase the inner volume of the sealing member 26.

With the above-described configuration, when the pressure inside the sealing member 26 is increased by vaporization of the refrigerant 27, expansion of the expansion portion 39 further decreases the pressure inside the sealing member 26. This further reduces the production cost of the cooling member 13.

Furthermore, in the embodiment, the sealing member 26 has the contact portion 30 in contact with the power storage element 12, and the expansion portion 39 is located away from at least the contact portion 30 of the sealing member 26.

With the above-described configuration, the refrigerant 27 at the contact portion 30 vaporized by the heat from the power storage element 12 moves to the expansion portion 39 and expands the expansion portion 39. The refrigerant 27 is cooled at the expansion portion 39 and condenses into a liquid. At this time, the heat is diffused to the outside of the sealing member 26. As described above, since the heat from the power storage element 12 is reliably received at the contact portion 30, and the heat is reliably diffused at the expansion portion 39, the cooling member 13 has higher cooling performance.

Furthermore, in this embodiment, the sealing member 26 has the contact portion 30 in contact with the power storage element 12, and the absorbing member 37 is disposed in the sealing member 26 over an area equal to or larger than the area of the contact portion 30 of the sealing member 26.

With this configuration, the heat at the contact portion 30 transferred from the power storage element 12 is reliably transferred to the absorbing member 37. Since the absorbing member 37 contains the refrigerant, the heat from the power storage element 12 functions as heat of vaporization used to vaporize the refrigerant 27. Thus, the power storage element 12 is reliably cooled.

Furthermore, in this embodiment, the absorbing member 37 allows the refrigerant 27 to move up in the absorbing member 37 such that a height between an uppermost position of the refrigerant 27 determined after an end of the absorbing member 37 arranged in a vertical position is immersed in the refrigerant 27 for 60 seconds and a surface of the refrigerant 27 is 5 mm or more.

With the above-described configuration, the refrigerant 27 is more reliably absorbed, improving the cooling performance of the cooling member 13.

Furthermore, the power storage module 10 according to the embodiment includes the cooling member 13, the case 11 housing the cooling member 13, and the power storage element 12 housed in the case 11 and being in contact with the cooling member 13 at at least at a portion of the outer surface thereof.

With the above-described configuration, the heat generated at the power storage element 12 is absorbed by the cooling member 13 in contact with a portion of the outer surface of the power storage element 12. The heat absorbed by the cooling member 13 is diffused to the outside of the cooling member 13 as described above. This efficiently cools the power storage element 12.

The above-described cooling member 13 has a liquid-tightly closed configuration, and the refrigerant 27 is enclosed in the liquid-tightly closed cooling member 13. Thus, the case 11 of the power storage module 10 does not need to have a liquid-tightly closed configuration. This reduces the production cost of the power storage element 12.

This embodiment reduces temperature variation in a heat source having a portion to be locally heated. This is based on the following. The temperature at a portion of the heat source locally increases when the portion generates heat. Then, at the portion of the cooling member 13 in contact with the portion where the temperature has increased, the temperature of the refrigerant 27 increases and the refrigerant 27 vaporizes. The heat of vaporization of the refrigerant 27 quickly removes the heat of the portion of the heat source where the temperature has increased, making temperature variation in the heat source smaller.

The refrigerant 27 that has vaporized into vapor quickly moves up inside the sealing member 26. In other words, the heat is transferred by the movement of the refrigerant 27 in the form of vapor. This improves the heat transfer rate compared with a case in which a metal heat sink is used, for example. Typically, the transfer rate of the refrigerant 27 in the form of vapor is higher than that of heat transferring in the solid heat sink.

The above-described refrigerant 27 that has moved up inside the sealing member 26 is cooled at the expansion portion 39 to condense into a liquid. Thus, the heat generated at the portion locally heated is efficiently diffused to the outside of the sealing member 26. This reduces temperature variation in a heat source that has a portion locally heated. This technology is preferably applicable to a heat source, such as the power storage element 12, which has a leading portion or the like locally heated to a high temperature.

SECOND EMBODIMENT

Figure 10:
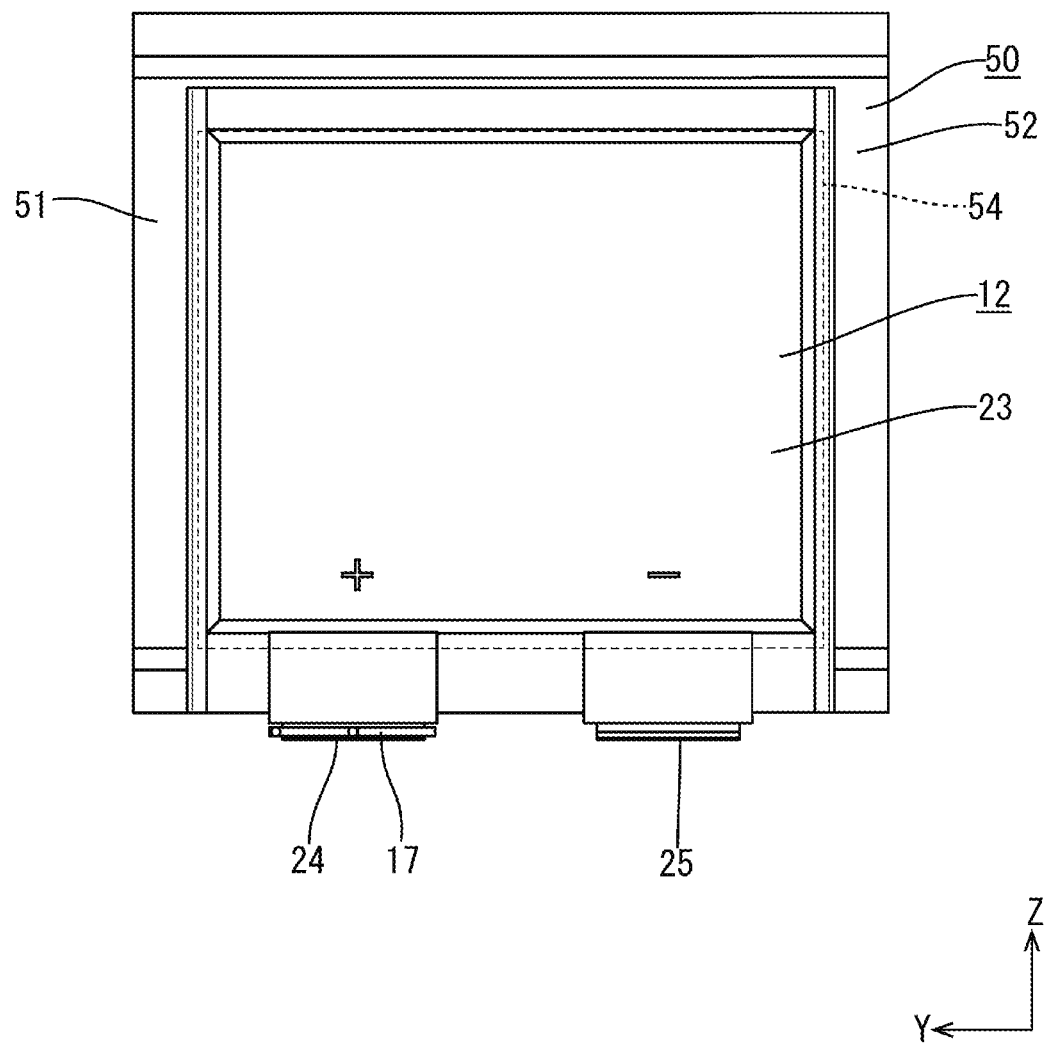
FIG. 10 is a side view illustrating a cooling member and a power storage element according to a second embodiment.

Next, a second embodiment according to a technology disclosed herein is described with reference to FIG. 10. A sealing member 51 of a cooling member 50 according to this embodiment includes a first sheet member 52 and a second sheet member (not illustrated) each having a synthetic resin layer on only one surface thereof. The first sheet member 52 and the second sheet member 53 are thermally welded to each other in the sealing member 51 with the synthetic resin layers being overlapped and in contact with each other.

The metal sheets included in the first and second sheet members 52 and 53 are exposed on the outer surface of the sealing member 51.

An absorbing member 54 is disposed in the sealing member 51 over an area equal to or larger than the contact portion 30.

The other components than the above-described components in the second embodiment are substantially the same as those in the first embodiment. Thus, identical components are assigned the same reference numerals and are not repeatedly described.

In this embodiment, the first sheet member 52 and the second sheet member each have the synthetic resin layer having a synthetic resin thereon. The first sheet member 52 and the second sheet member are thermally bonded to each other with the synthetic rein layers facing to the inner side, and the metal sheets are exposed on the outer surface of the sealing member 51.

With the above-described configuration, the heat is diffused to the outside of the sealing member 51 through the metal sheets exposed on the outer surface of the sealing member 51, improving heat dissipation properties compared with a configuration having resin further on the outer surface of the sheet member.

EXPERIMENTAL EXAMPLE

An experimental example is described below to show advantages of the technology disclosed in the specification. As indicated in Table 1, cooling members according to experimental examples 1 to 8 were produced. A polyethylene sheet member was cut out to have 170 mm×120 mm size. Two sheet members were overlapped each other and 10 ml of a refrigerant and a nonwoven fabric were sandwiched therebetween. Then, the two sheet members were welded at side ends to be in a liquid-tightly closed state.

TABLE 1

| Experimental Examples | Liquid Absorption Height (mm) | Weight (g/m$^2$) | Thickness (mm) | Temperature (° C.) | Water Absorption Height (mm) |
|---|---|---|---|---|---|
| 1 | 32 | 230 | 0.68 | 51.1 | 73 |
| 2 | 10 | 230 | 3.2 | 55.7 | 9 |
| 3 | 10 | 240 | 2.19 | 55.4 | 20 |
| 4 | 2 | 120 | 2.31 | 57.4 | 23 |
| 5 | 4 | 145 | 1.74 | 56.5 | 11 |
| 6 | 18 | 180 | 1.44 | 54.3 | 38 |
| 7 | 5 | 55 | 1.83 | 55.1 | 27 |
| 8 | 29 | 210 | 1.62 | 53.5 | 58 |
| 9 | 32 | 120 | 0.6 | 52.1 | 70 |

As indicated in Table 1, the nonwoven fabrics used in the experiments are different in weight and thickness, and the nonwoven fabrics are formed of different materials.

The refrigerant used in the experiments was Novec™ 649 (hereinafter, referred to as a refrigerant) produced by 3M Japan Limited.

The liquid absorption heights in Table 1 were determined as follows. A nonwoven fabric was cut out to have a size of 10 cm×10 cm. The nonwoven fabric was positioned in the vertical direction with one end thereof being immersed into the refrigerant by 5 mm. Then, the state was kept for 60 seconds, and the height between the uppermost position of the refrigerant moved up in the nonwoven fabric and the surface of the refrigerant was determined.

The temperatures in Table 1 were determined as follows. An electric heater having a size of 10 cm×10 cm was pushed onto one surface of the cooling member. The heater was pressed against the cooling member at a pressure of 0.2 Pa. Heat of 12 W was supplied to the heater. A temperature sensor was disposed between the heater and the cooling member. Thus, the temperatures indicated in Table 1 are temperatures of the surface of the heater between the heater and the cooling member. Table 1 shows temperatures determined after 30 minutes of heating of the heater.

Figure 11:
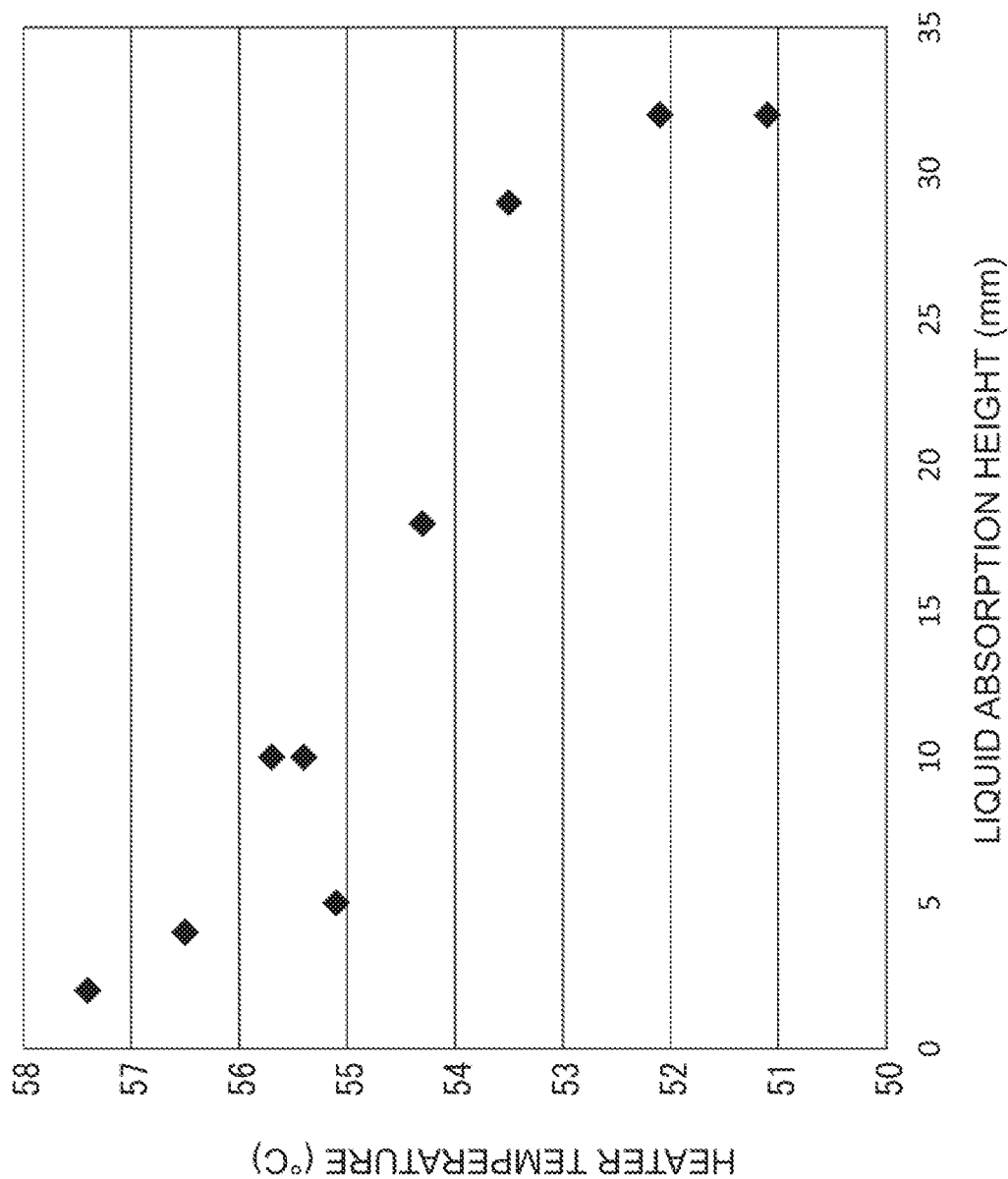
FIG. 11 is a graph indicating a change in temperature of a heater relative to refrigerant absorption heights.

FIG. 11 is a graph indicating changes in temperature of the heater relative to the refrigerant absorption height. It was found that the temperature of the heater tends to decrease as the liquid absorption height increases. This is based on the following reasons.

The refrigerant absorption height is a value relating to the speed at which the nonwoven fabric absorbs the refrigerant against the gravity. The larger the value of the liquid absorption height, the higher the speed at which the nonwoven fabric absorbs the refrigerant.

The nonwoven fabric which absorbs the refrigerant at a high speed allows the refrigerant to travel in the nonwoven fabric at a relatively high speed. Thus, if the refrigerant is vaporized at a portion of the cooling member and the refrigerant at the portion is reduced, the refrigerant is quickly supplied from another portion. Thus, the nonwoven fabric is unlikely to be dried, allowing the cooling performance of the cooling member to be kept at a high level.

As indicated in FIG. 11, when the refrigerant absorption height exceeds 18 mm, the heater temperature drops sharply, and thus this is preferable. Furthermore, when the refrigerant absorption height exceeds 29 mm, the heater temperature further drops, and thus this is more preferable. Still furthermore, when the refrigerant absorption height exceeds 32 mm, the heater temperature still further drops, and thus this is further preferable. When the refrigerant absorption height exceeds 32 mm, the heater temperature particularly drops, and thus this is particularly preferable.

Table 1 includes water absorption heights. The water absorption heights were determined as follows. A nonwoven fabric was cut out to have a size of 10 cm×10 cm. The nonwoven fabric was positioned in the vertical direction with one end thereof being immersed into water by 5 mm. Then, the state was kept for 60 seconds, and the height between the uppermost position of the water moved up in the nonwoven fabric and the surface of the water was determined.

Figure 12:
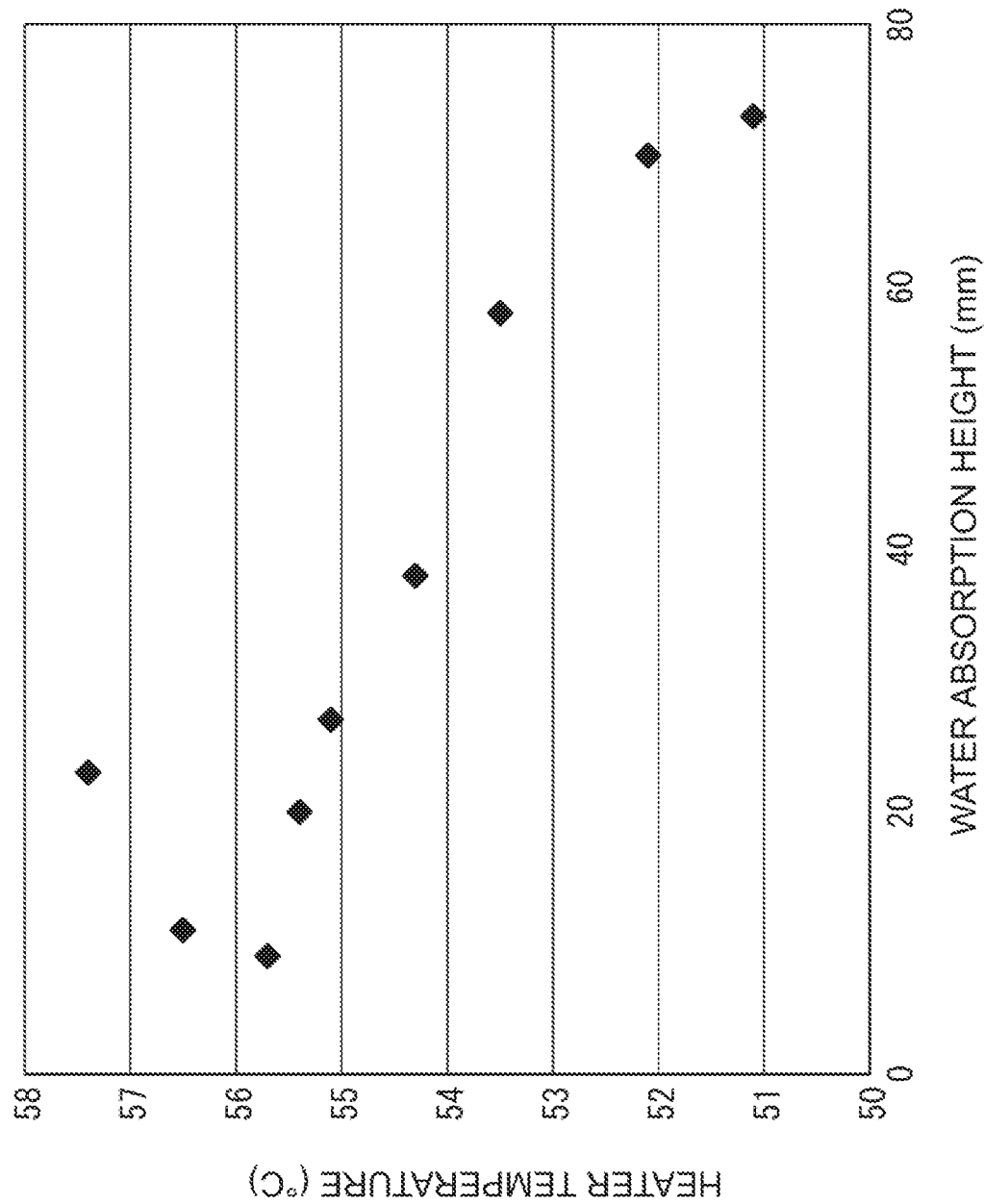
FIG. 12 is a graph indicating a change in temperature of a heater relative to water absorption heights.

FIG. 12 is a graph indicating changes in temperature of the heater relative to the water absorption height. In the sealing member of the cooling member used in the measurement, Novec™ 649 produced by 3M Japan Limited was disposed.

As indicated in FIG. 12, the temperature of the heater tends to decrease as the water absorption height increases. It was found that this substantially corresponds to the relationship between the refrigerant absorption height determined using the refrigerant and the heater temperature.

When the water absorption height exceeds 38 mm, the heater temperature drops sharply, and thus this is preferable. Furthermore, when the refrigerant absorption height exceeds 58 mm, the heater temperature further drops, and thus this is more preferable. Still furthermore, when the refrigerant absorption height exceeds 70 mm, the heater temperature still further drops, and thus this is further preferable. When the refrigerant absorption height exceeds 73 mm, the heater temperature particularly drops, and thus this is particularly preferable.

It is found that water, which is different from the refrigerant in the cooling member, has a correlation with the cooling performance of the cooling member.

THIRD EMBODIMENT

Next, a third embodiment according to a technology disclosed in the specification is described with reference to FIG. 13 to FIG. 39. This embodiment includes an absorbing member having a different shape from the absorbing members 37 and 54 in the sealing member 26. The other components are substantially identical to those in the above-described embodiments unless otherwise specified and are not described.

Figure 13:
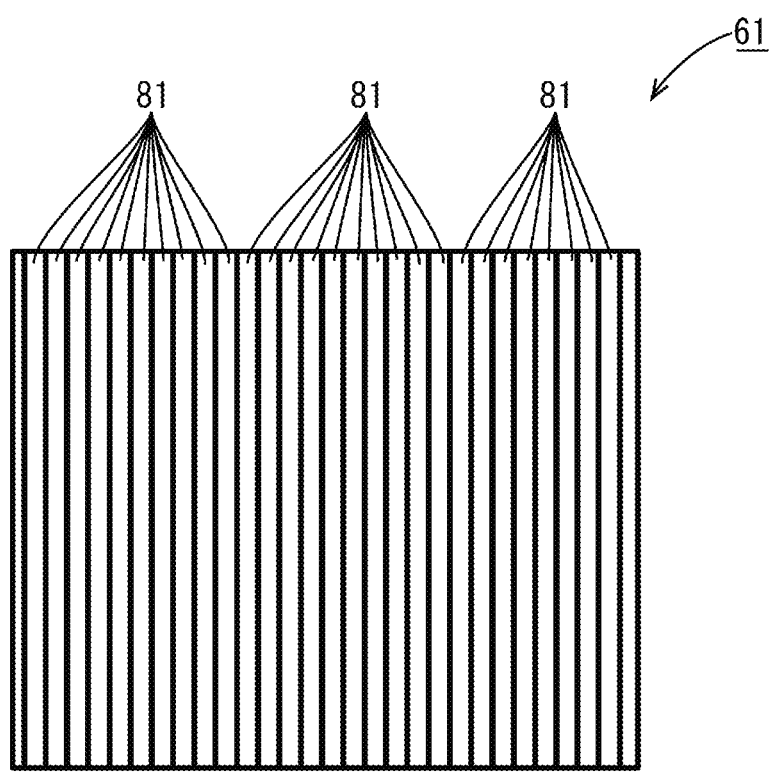
FIG. 13 is a side view illustrating an absorbing member according to a third embodiment.
Figure 14:
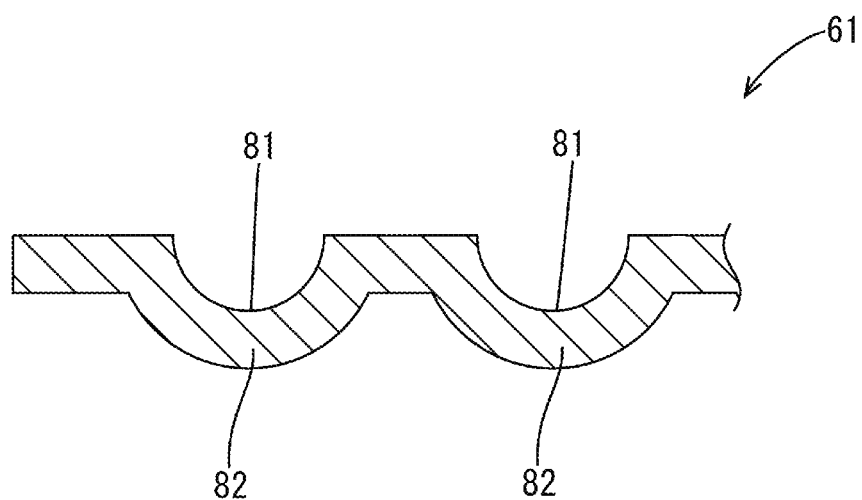
FIG. 14 is a magnified transverse cross-sectional view illustrating passages of the absorbing member.
Figure 15:
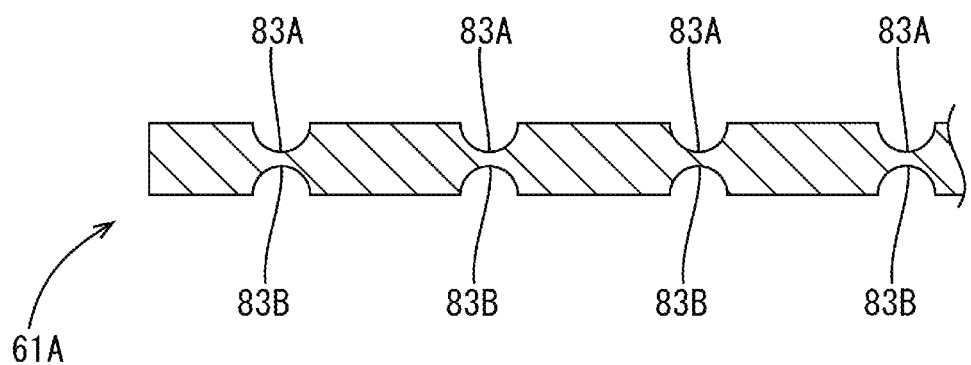
FIG. 15 is a magnified transverse cross-sectional view illustrating passages of another absorbing member.
Figure 16:
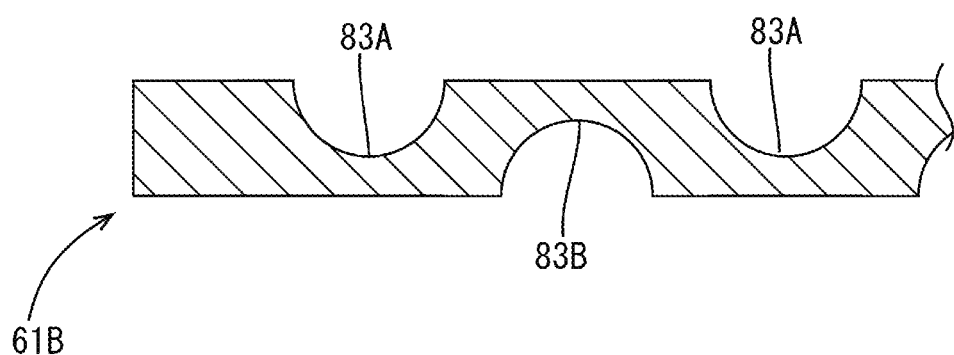
FIG. 16 is a magnified transverse cross-sectional view illustrating passages of another absorbing member.
Figure 17:
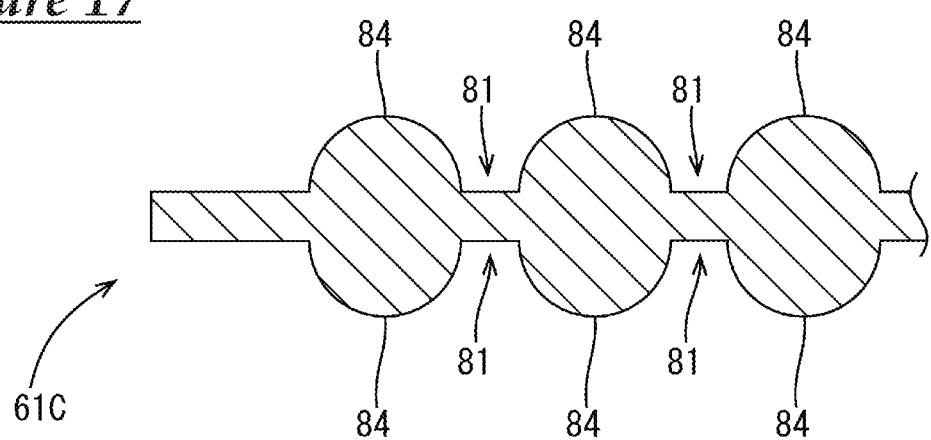
FIG. 17 is a magnified transverse cross-sectional view illustrating passages of another absorbing member.

As illustrated in FIG. 13, an absorbing member 61 has many (plural) passages 81 of the refrigerant 27 extending in the up-down direction on both outer surfaces of the absorbing member 61 (side surfaces facing the inner surfaces of the sealing member 26 of the absorbing member 61). The passages 81 are arranged side by side in the left-right direction in FIG. 13. The passages 81 are included in the both surfaces of the absorbing member 61 and are defined by alternately arranged concavities and convexities. For example, as illustrated in FIG. 14, the passages 81 are defined by inner surfaces of semicircular curved portions 82 arranged with a predetermined distance therebetween in the planar absorbing member 61 having a constant thickness. The absorbing member 61 is produced, for example, by sandwiching an absorbing member having a constant thickness with a die of a pressing device (not illustrated) and pressing the absorbing member at positions corresponding to the passages 81 from one side to the other side.

The shape of the passage 81 is not limited to the above-described shape. For example, as in an absorbing member 61A illustrated in FIG. 15, grooves 83A and 83B each having a recessed circular arc shape, which are formed by pressing the plate-shaped absorbing member 61A from both sides with a die (a die having convexities), may be used as the passages 81 of the refrigerant 27. In such a case, since the portion between the groove 83A and the groove 83B is compressed, the portion between the groove 83A and the groove 83B has higher density. Alternatively, as in an absorbing member 61B illustrated in FIG. 16, the grooves 83A on the upper side and the grooves 83B on the lower side may be located differently in an arrangement direction of the grooves 83A and 83B. Alternatively, as in an absorbing member 61C illustrated in FIG. 17, the absorbing member 61C may be sandwiched with a die having concavities to form protrusions 84 protruding in a circular arc shape at portions to which a lower pressure is applied, and portions between adjacent protrusions 84 may be used as the passages 81 of the refrigerant 27. In other words, a pressure applied to the absorbing member with a die may be changed at the positions of the passages 81 to change the density thereof and form the passages 81.

Figure 18:
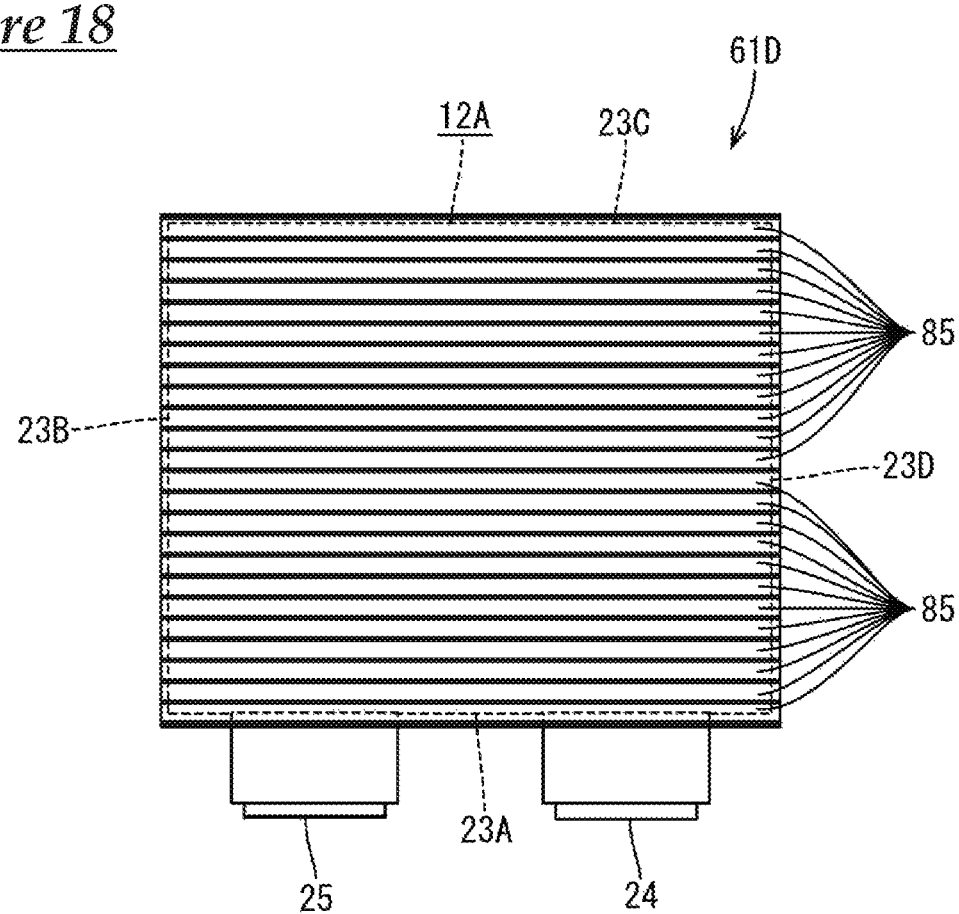
FIG. 18 is a side view illustrating another absorbing member and a power storage element.

The shapes (pattern) of the many (plural) passages 81 of the refrigerant 27 of the absorbing member 61 are not limited to those described above and may be any other shape. For example, as illustrated in FIG. 18, many (plural) passages 85 of the refrigerant 27 extending in the left-right direction may be arranged in the up-down direction. Here, the power storage element 12 placed on an absorbing member 61D and being in contact with the cooling member 13 has a positive electrode terminal 24 and a negative electrode terminal 25 protruding beyond the outer edge of the body 12A, which houses the electric storage component (not illustrated) between the two battery laminate sheets 23. In FIG. 18, the passages 85 in the absorbing member 61D extend from a right side 23D (one side) toward a left side 23B (another side) of four sides 23A to 23D defining the outer periphery of the body 12. When a heat dissipation member for releasing the heat of the power storage element 12 is disposed near the body 12A of the power storage element 12, the heat dissipation member may be disposed near one of the sides 23B to 23D, of four sides 23A to 23D of the body 12A, from which at least one of the positive electrode terminal 24 and the negative electrode terminal 25 does not protrude. This is reasonable because the positive electrode terminal 24 and the negative electrode terminal 25 do not prevent placement of the dissipation member. Here, the passage 85 in the absorbing member 61 extending from one of the sides 23B to 23D, of the four sides 23A to 23D of the body 12A, from which the positive electrode terminal 24 and the negative electrode terminal 25 do not protrude, toward another side allows the heat of the power storage element 12 to be readily transferred to the heat dissipation member that is disposed on one of the sides 23B to 23D through the refrigerant 27 traveling through the passage 85. This improves heat dissipation properties. In FIG. 18, the passages 85 extend in the left-right direction, but the shape of the passages 85 is not limited to this. The passages 85, which extends from one of the sides 23B to 23D toward another side, may extend from the side 23D (or the side 23B) toward the side 23A or the side 23C.

Figure 19:
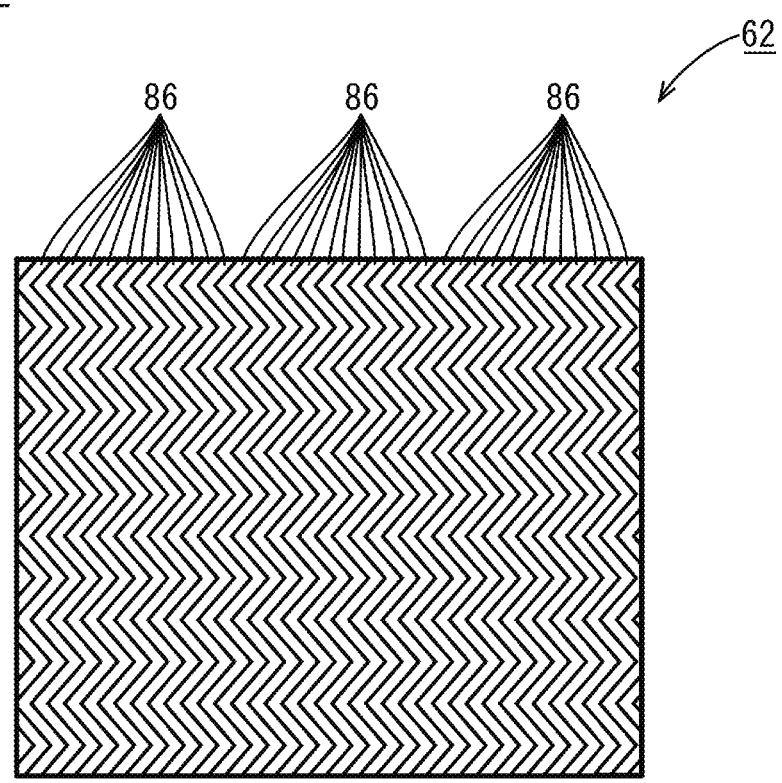
FIG. 19 is a side view illustrating another absorbing member.

Alternatively, the passages 81 of an absorbing member 62 may have a shape (pattern) illustrated in FIG. 19. The shape is formed by many passages 86 formed of grooves (concavities) or protrusions (convexities) arranged in the left-right direction in a herringbone pattern. In such a case, the positive electrode terminal 24 and the negative electrode terminal 25 of the power storage element 12 may be disposed on the upper side or the lower side of the absorbing member 62 in FIG. 19, for example.

Figure 20:
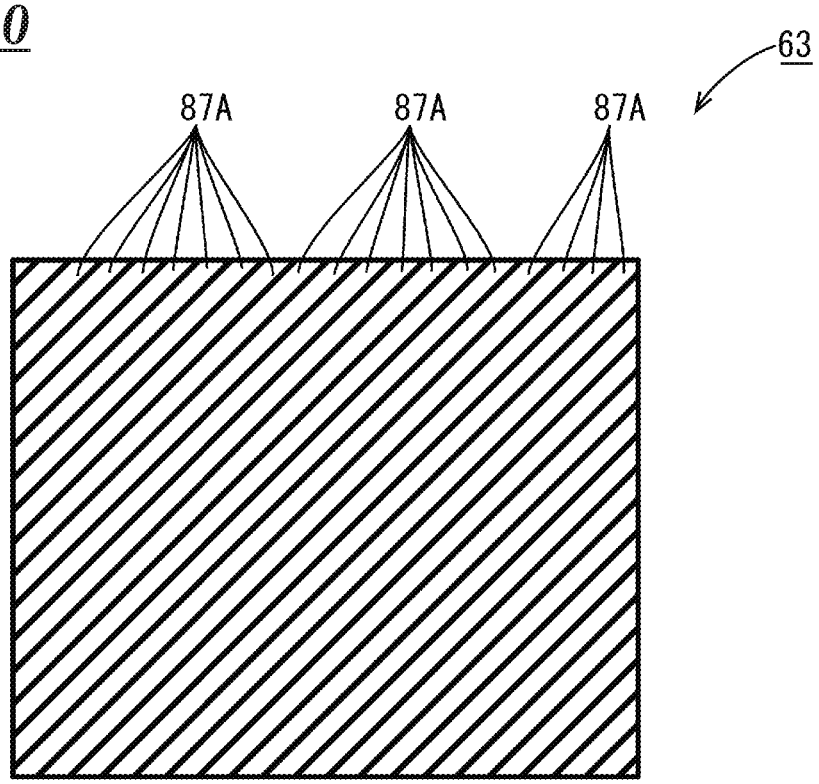
FIG. 20 is a side view illustrating another absorbing member.
Figure 21:
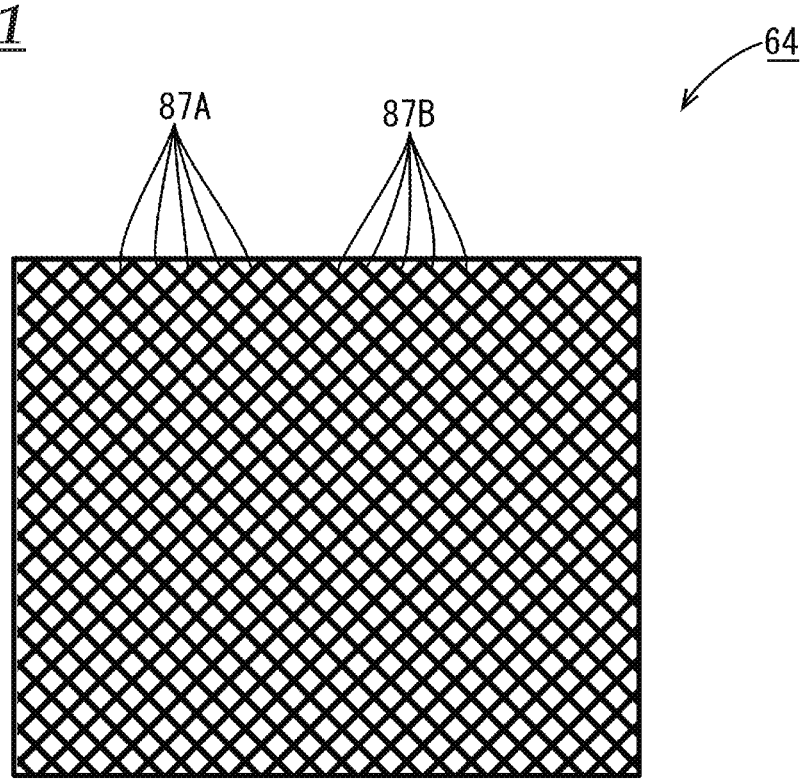
FIG. 21 is a side view illustrating another absorbing member.
Figure 22:
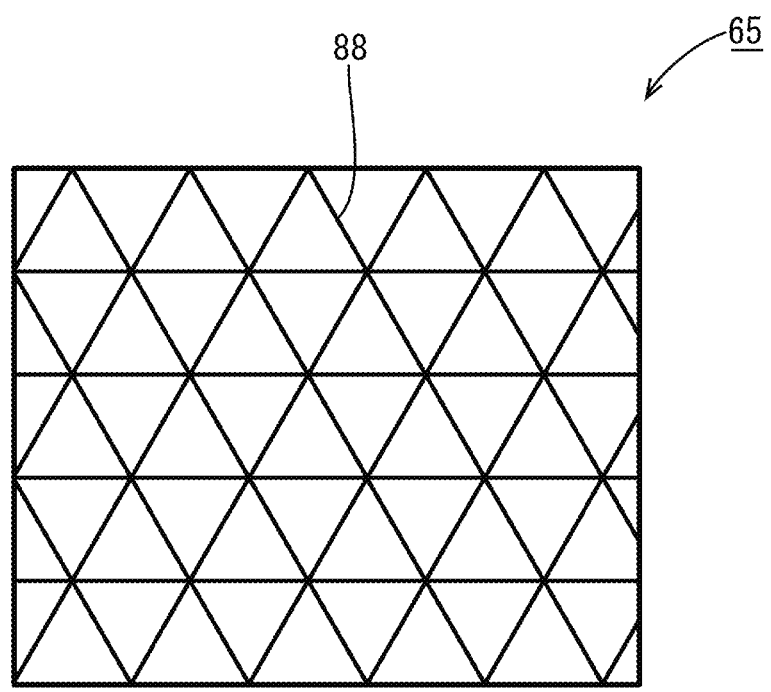
FIG. 22 is a side view illustrating another absorbing member.
Figure 23:
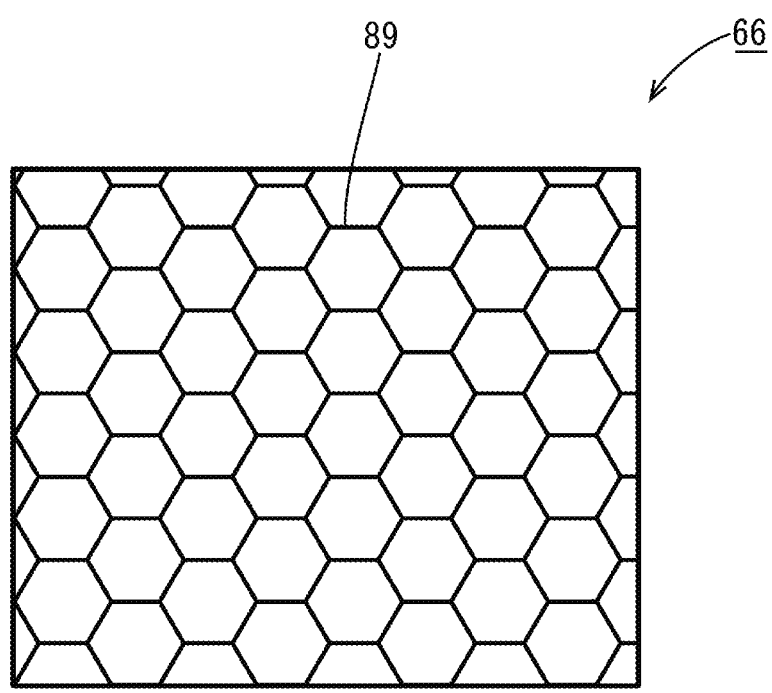
FIG. 23 is a side view illustrating another absorbing member.
Figure 24:
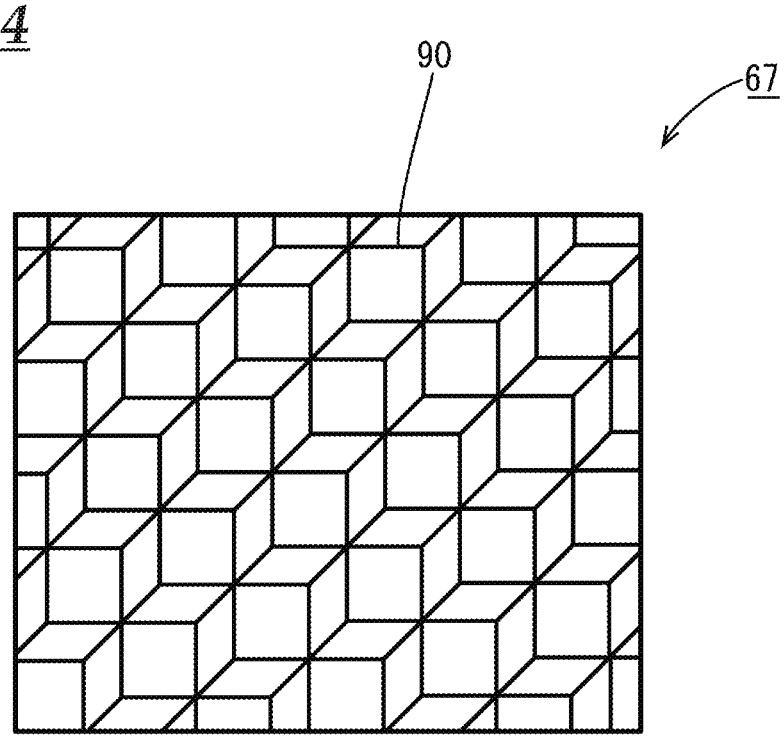
FIG. 24 is a side view illustrating another absorbing member.

The pattern of the passages of the absorbing member is not limited to vertical stripes and horizontal stripes. As illustrated in FIG. 20, the passages may be passages 87A formed of grooves or protrusions extending in a diagonal direction of an absorbing member 63. Alternatively, as illustrated in FIG. 21, the pattern may be a check in which passages 87A and 87B formed of grooves or protrusions extending in a diagonal direction with respect to the up-down direction of an absorbing member 64 intersect each other (at right angles). Alternatively, as illustrated in FIG. 22 and FIG. 23, passages 88 may be formed of grooves or protrusions extending continuously in triangular shapes (equilateral triangles) and intersecting each other on the outer surface of an absorbing member 65, or passages 89 may be formed of grooves or protrusions extending continuously in hexagonal shapes (equilateral hexagons) and intersecting each other on the outer surface of an absorbing member 66. The passages may continuously extend in other polygonal shapes. Alternatively, the passages may be formed of concavities or convexities having the above-described polygonal shape. For example, the concavities and the convexities of the polygonal shape may be alternately arranged. Alternatively, as illustrated in FIG. 24, passages 90 may be formed of grooves or protrusions continuously extending in a grid pattern composed of cubes in oblique projection and intersecting each other on the outer surface of the absorbing member 67.

Figure 25:
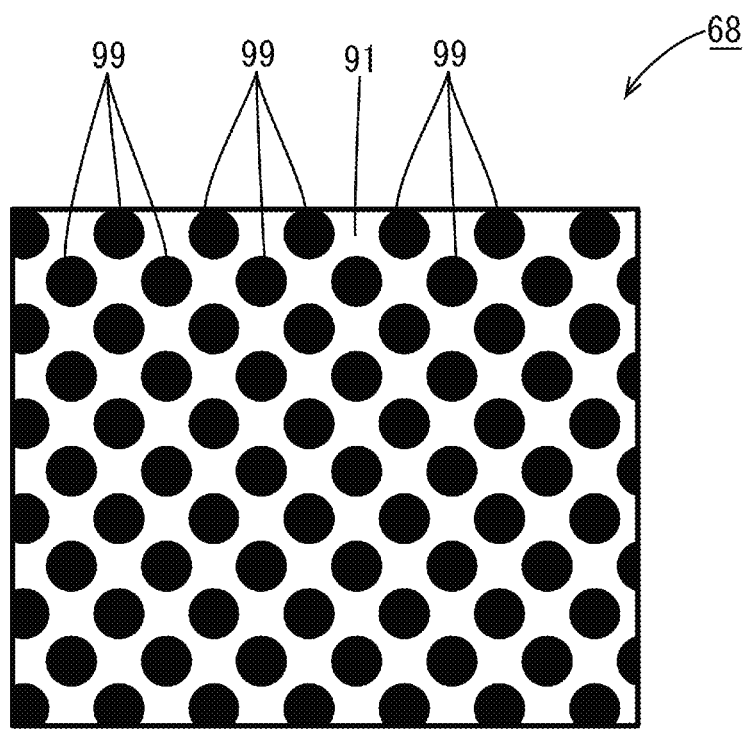
FIG. 25 is a side view illustrating another absorbing member.
Figure 26:
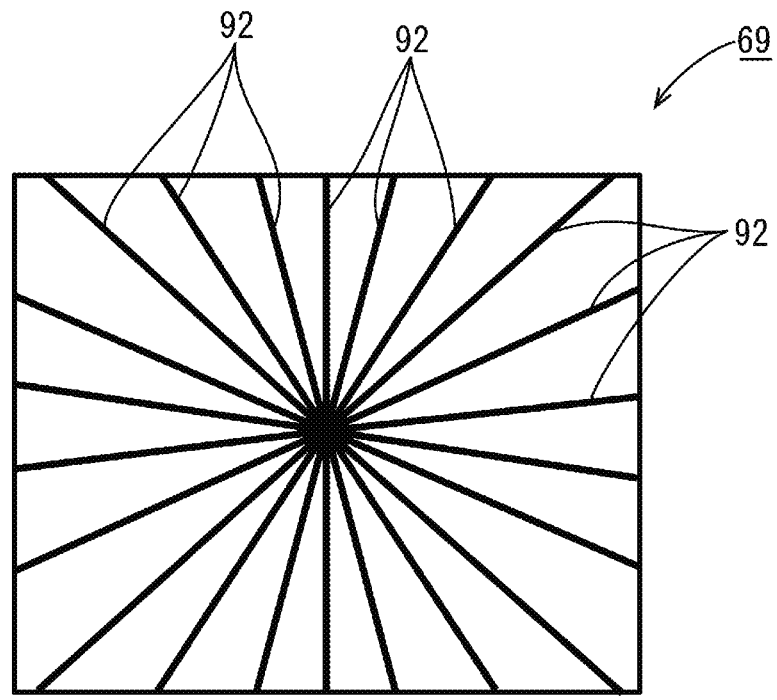
FIG. 26 is a side view illustrating another absorbing member.

Alternatively, as illustrated in FIG. 25, passages 91 may be formed between dots 99 formed of many concavities recessed in a circular shape or convexities arranged in the outer surface of the absorbing member 68 with a distance therebetween. Alternatively, as illustrated in FIG. 26, an outer surface of an absorbing member 69 may have passages 92 formed of grooves or protrusions extending radially outwardly from the central portion.

Figure 27:
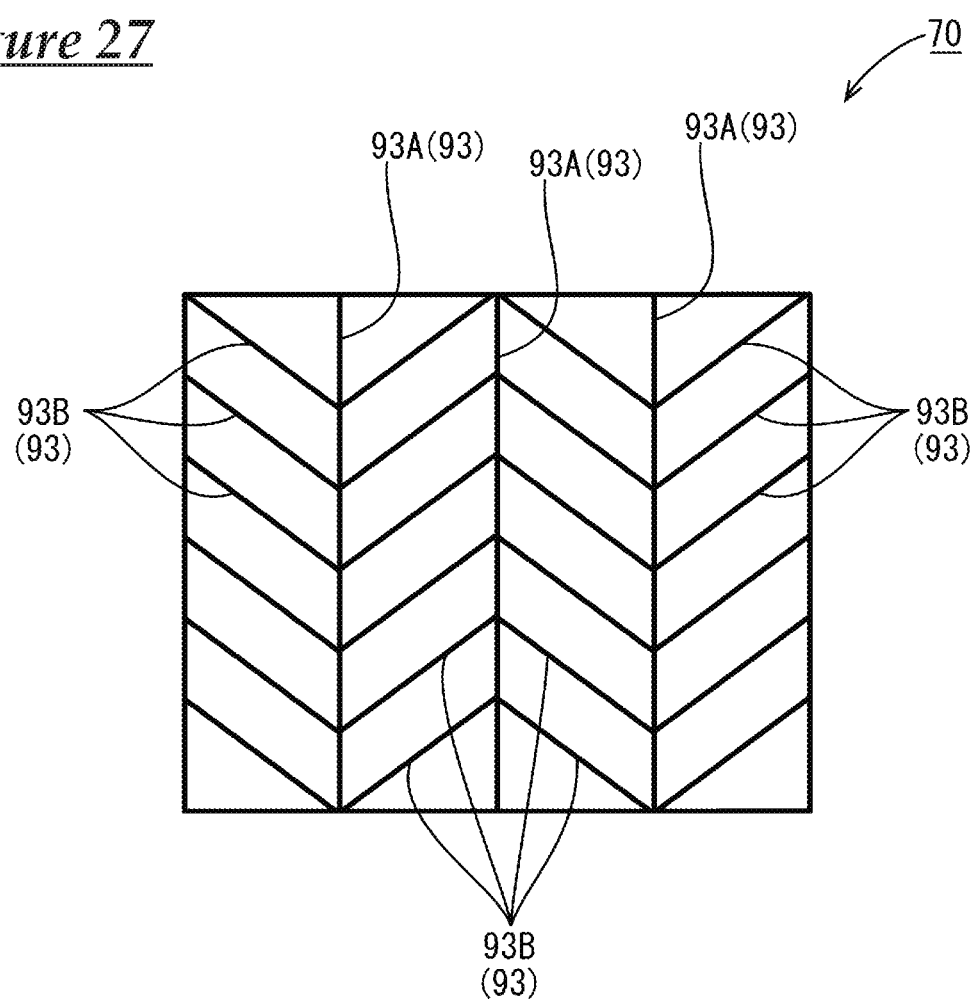
FIG. 27 is a side view illustrating another absorbing member.
Figure 28:
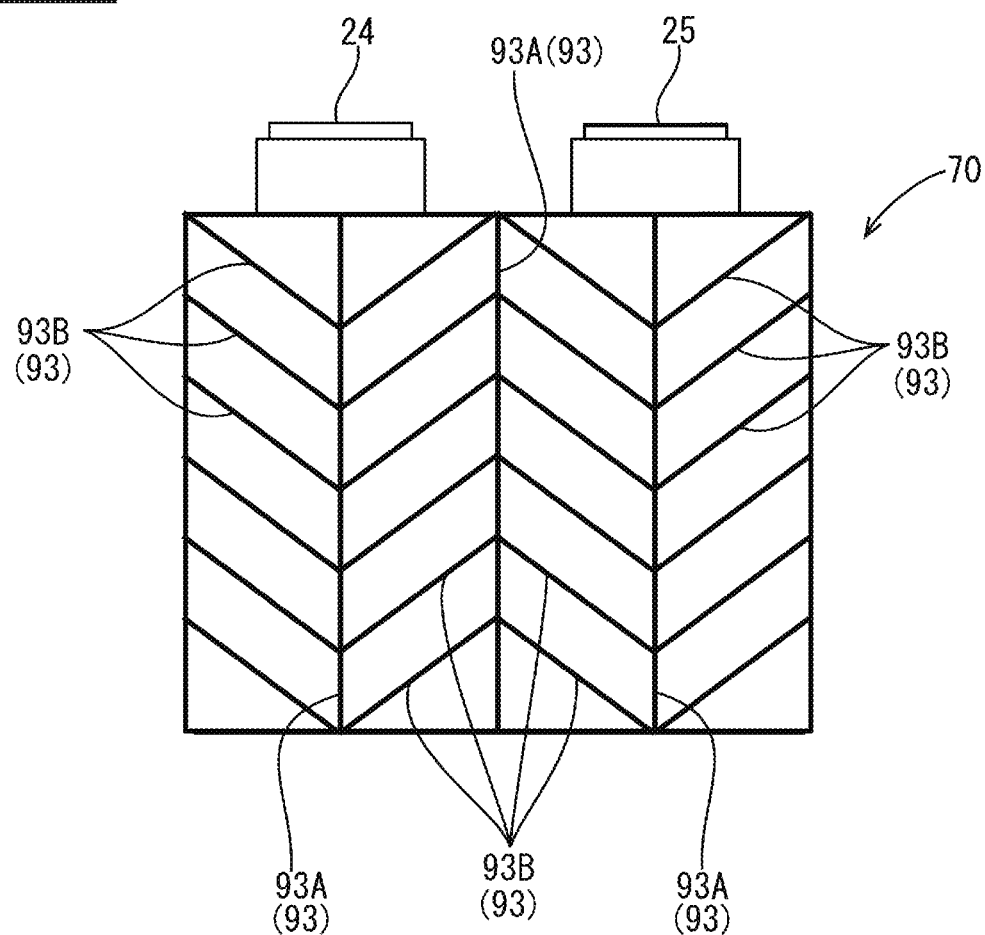
FIG. 28 is a view indicating a positional relationship between the absorbing member in FIG. 27 and terminals of a power storage element.

Alternatively, as illustrated in FIG. 27, passages 93 of an absorbing member 70 may include first passage portions 93A formed of grooves or protrusions extending in the up-down direction with a distance therebetween in the left-right direction and second passage portions 93B formed of grooves or protrusions extending diagonally relative to the first passage portions 93A. Here, as illustrated in FIG. 28, the power storage element 12 may be positioned such that the positive electrode terminal 24 and the negative electrode terminal 25 extend upwardly. In such a case, the first passage portions 93A extending to the base portions of the positive electrode terminal 24 and the negative electrode terminal 25 allows the heat of the positive and negative electrode terminals 24 and 25 to be readily transferred to the refrigerant 27 traveling through the first passage portion 93A. This more efficiently reduces the heat of the positive and negative electrode terminals 24 and 25.

Figure 29:
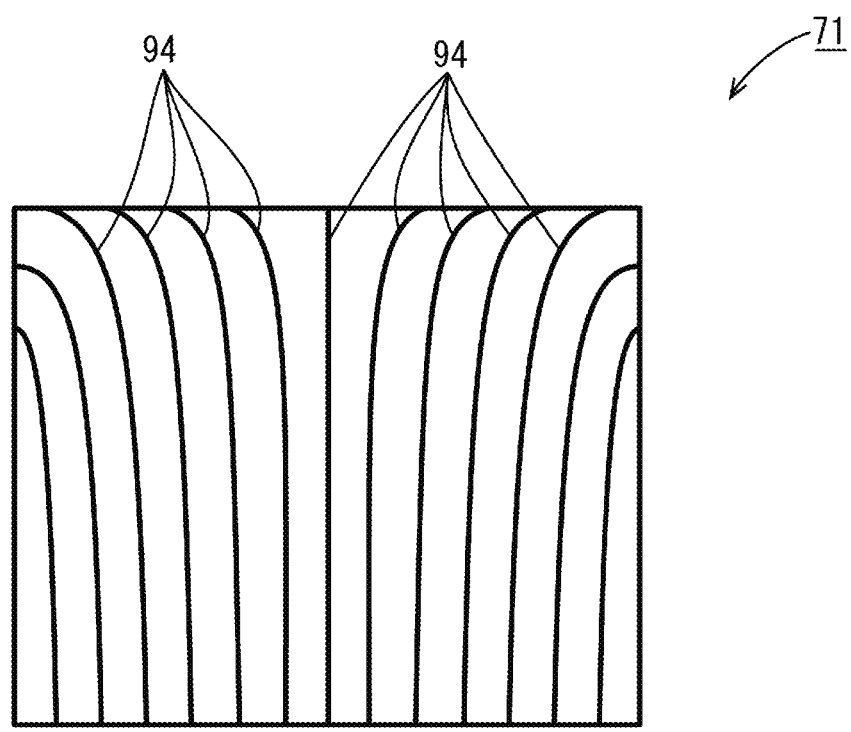
FIG. 29 is a side view illustrating another absorbing member.

Alternatively, as illustrated in FIG. 29, passages 94 formed of grooves or protrusions extending in a straight line in the outer surface of an absorbing member 71 may have a curved end portion at a position adjacent to at least one of the sides.

Figure 30:
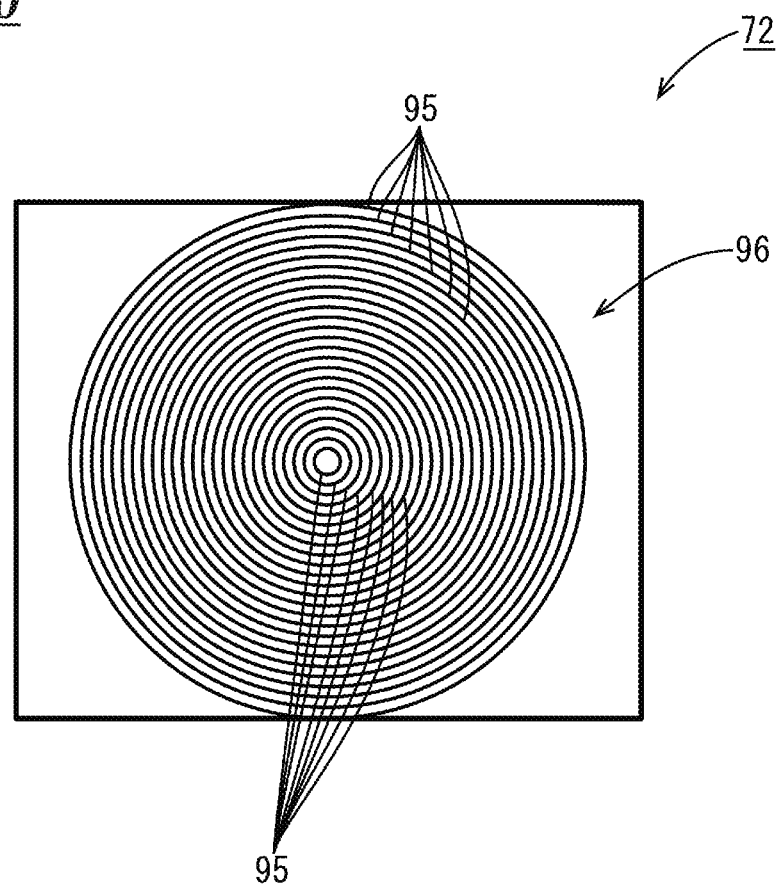
FIG. 30 is a side view illustrating another absorbing member.
Figure 31:
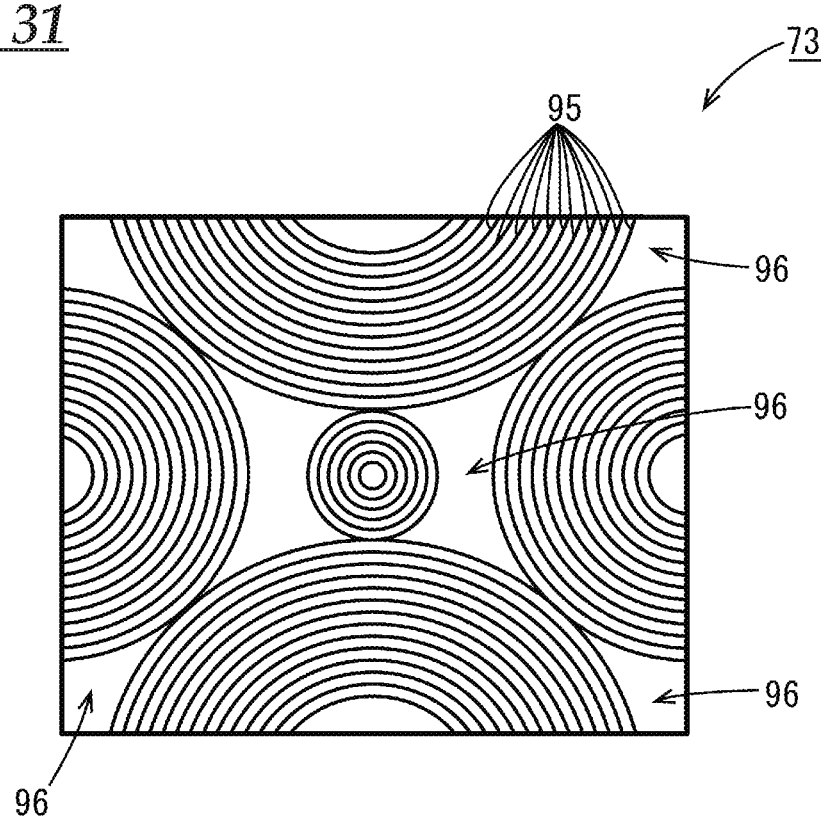
FIG. 31 is a side view illustrating another absorbing member.
Figure 32:
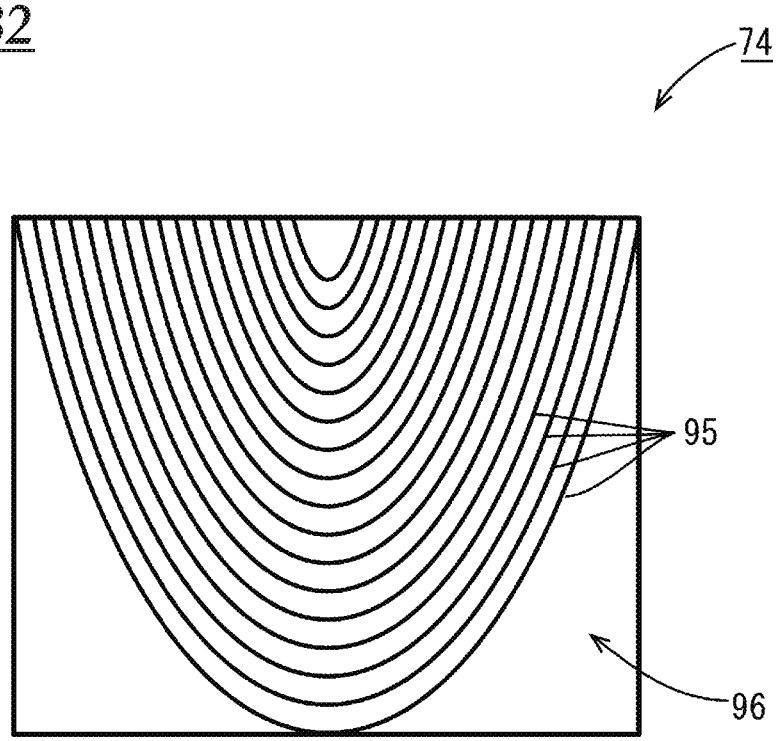
FIG. 32 is a side view illustrating another absorbing member.
Figure 33:
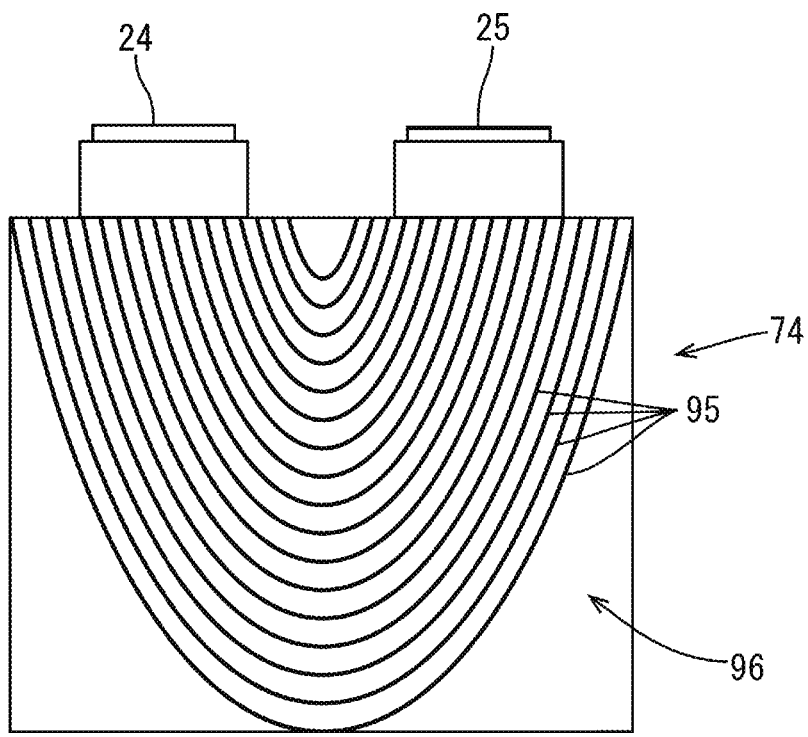
FIG. 33 is a view indicating a positional relationship between the absorbing member in FIG. 32 and terminals of a power storage element.
Figure 34:
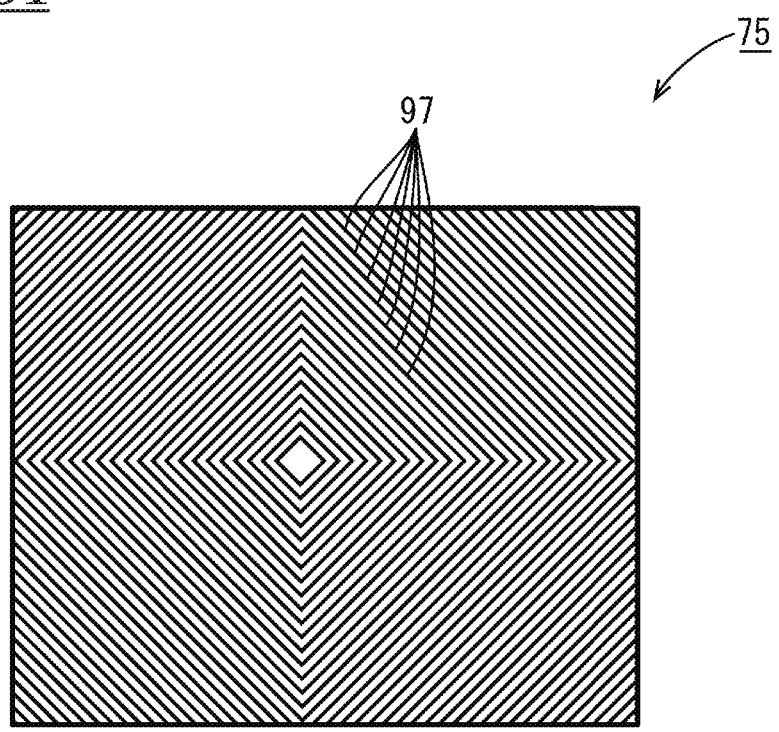
FIG. 34 is a side view illustrating another absorbing member.

Alternatively, as illustrated in FIG. 30, an absorbing member 72 may have a concentric circle pattern 96 including passages 95 formed of ring-shaped grooves or protrusions. Alternatively, as illustrated in FIG. 31, an absorbing member 73 may have a plurality of concentric circle patterns 96 in contact with each other at the outermost circle. Alternatively, as illustrated in FIG. 32, an absorbing member 74 may have a concentric semicircle pattern 96 having an oval shape. As illustrated in FIG. 33, the power storage element 12 may be positioned such that the positive electrode terminal 24 and the negative electrode terminal 25 extend upwardly. In such a case, the passages 95 extending to the base portions of the positive and negative electrode terminals 24 and 25 allow the heat of the positive and negative electrode terminals 24 and 25 to be transferred to the refrigerant 27 traveling through the passages 95. This efficiently reduces the heat of the positive and negative electrode terminals 24 and 25. Alternatively, as illustrated in FIG. 34, an absorbing member 75 may have passages 97 formed of rectangular concentric grooves or protrusions. The shape is not limited to a square and an oblong shape and may be any other polygonal shape.

Figure 35:
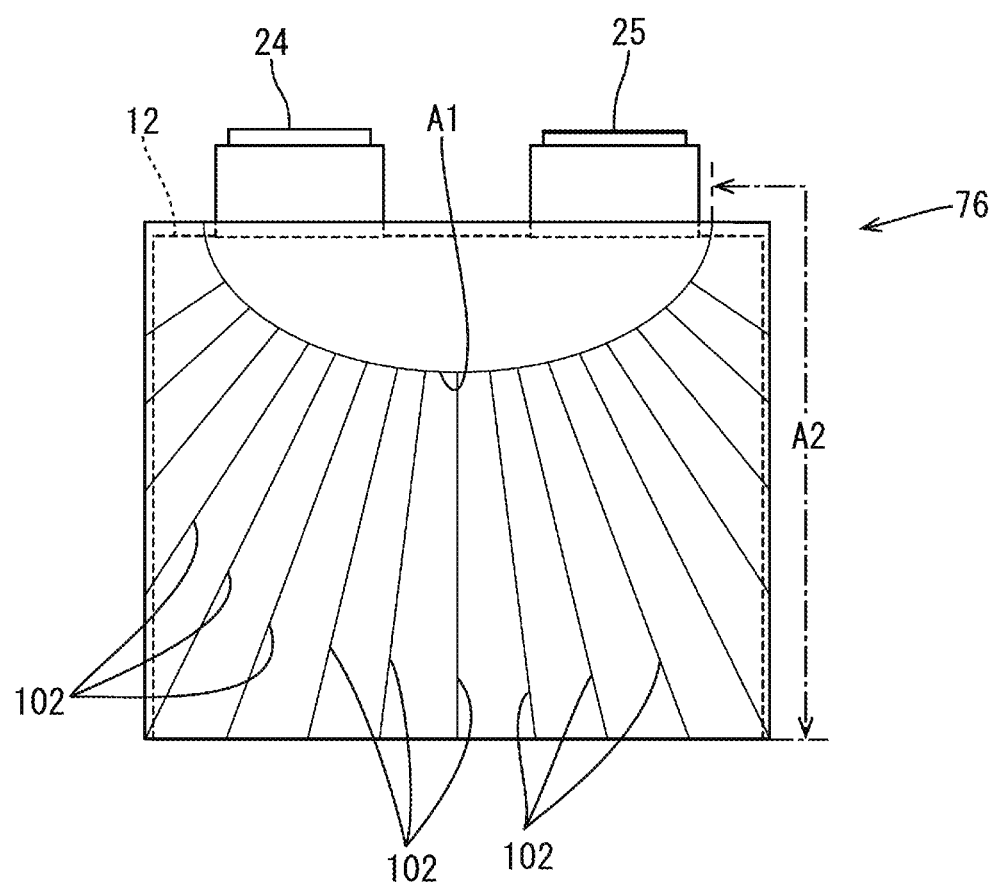
FIG. 35 is a side view illustrating another absorbing member and a power storage element.
Figure 36:
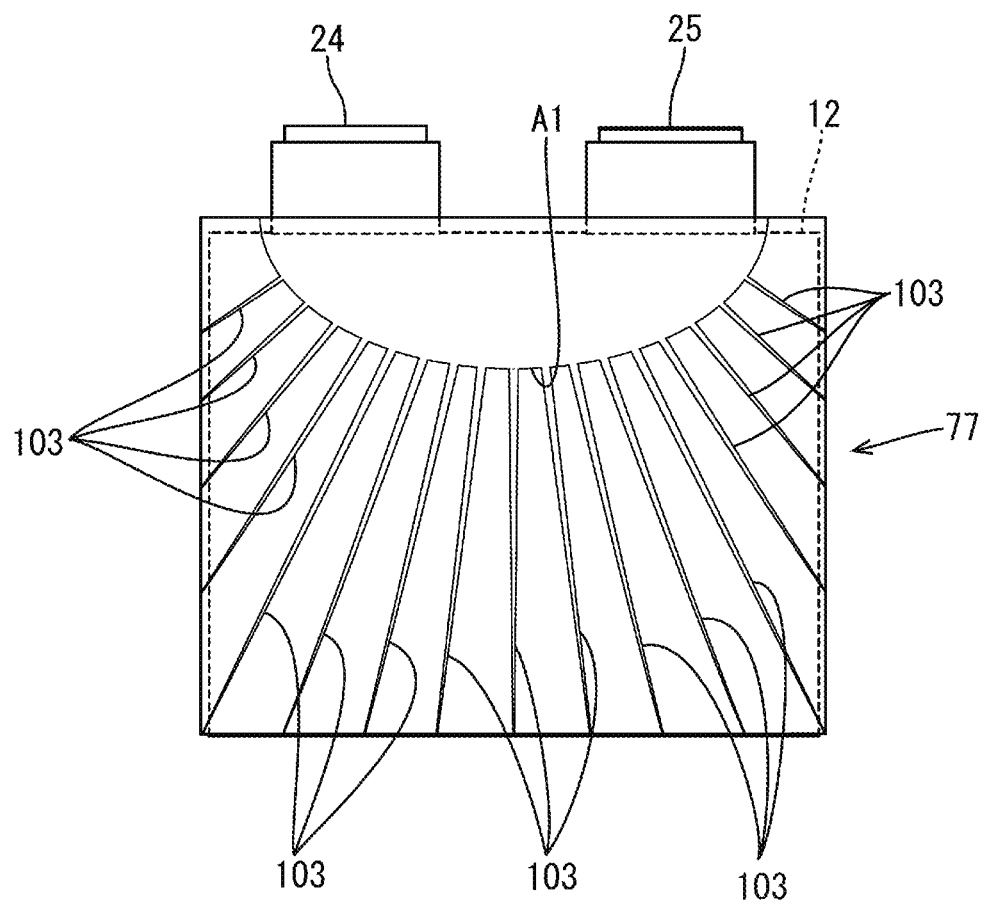
FIG. 36 is a side view illustrating a configuration having passages different in width from passages in FIG. 35.

Alternatively, as illustrated in FIG. 35, an absorbing member 76 may have a first area A1 extending from positions adjacent to the bases of the positive and negative electrode terminals 24 and 25 over a predetermined area (an area on the inner side of the curved line). The first area A1 receives the heat from the positive and negative electrode terminals 24 and 25. The first area A1 does not have passages formed of grooves or protrusions. An area outside the first area A1 may be a second area A2 having radial passages 102 formed of grooves or protrusions. Alternatively, as illustrated in FIG. 36, an absorbing member 77 may have passages 103 having the same pattern as the passages 102 but increasing in the width toward the first area A1.

Figure 37:
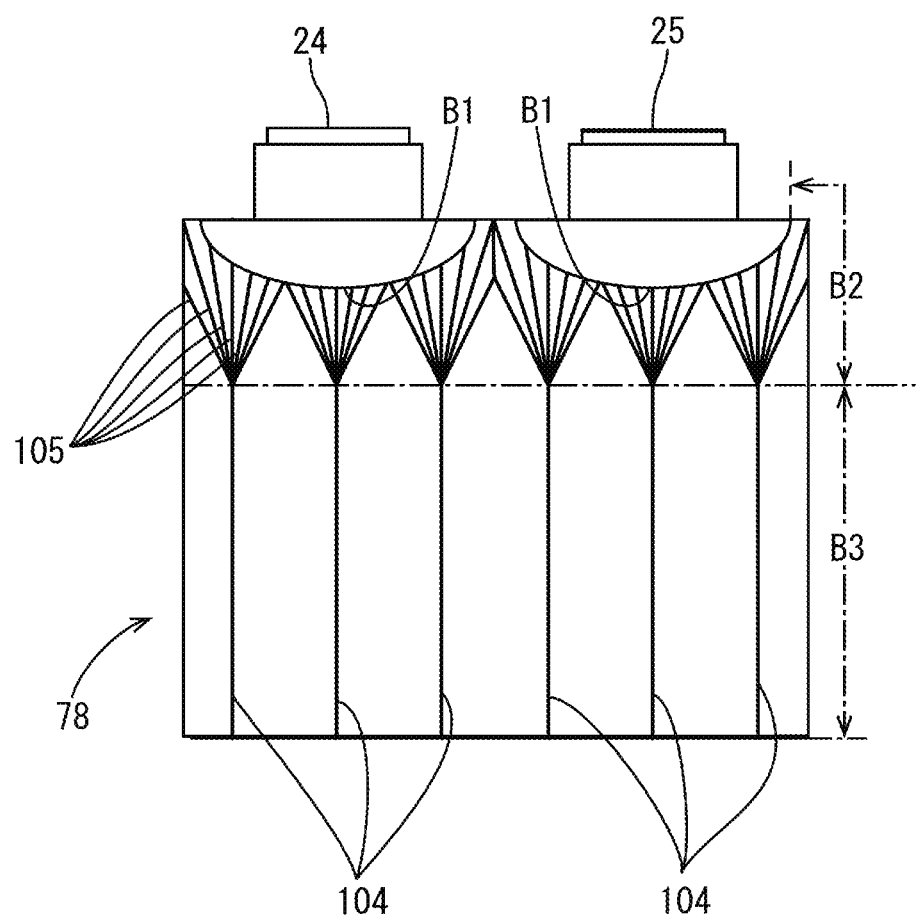
FIG. 37 is a side view illustrating a positional relationship between passages of another absorbing member and terminals of a power storage element.
Figure 38:
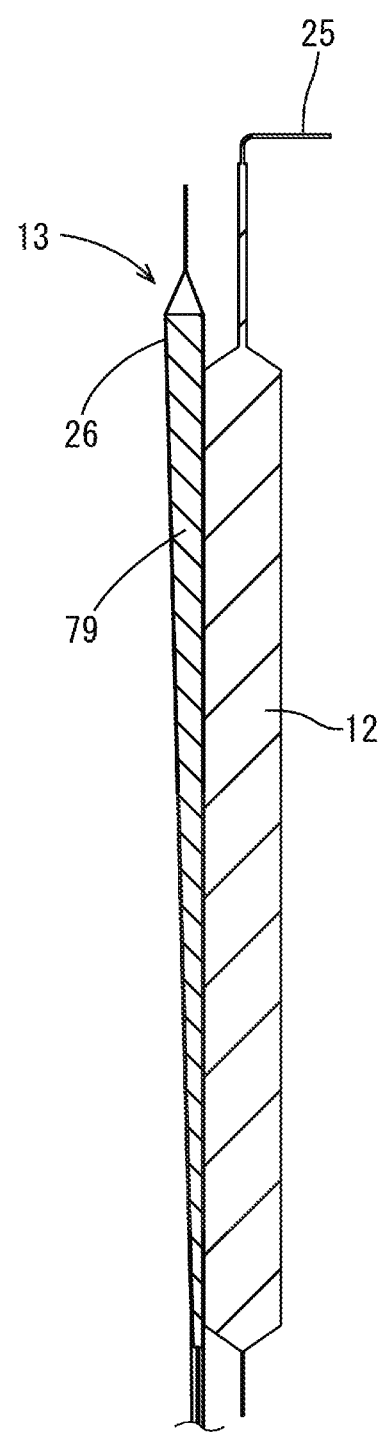
FIG. 38 is a side view illustrating a cooling member enclosing an absorbing member having thickness that varies depending on positions and a power storage element on the cooling member.

Alternatively, as illustrated in FIG. 37, an absorbing member 78 may have a first area B1 formed of a material different from a material forming the other areas at a position near the positive and negative electrode terminals 24 and 25. For example, the first area B1 near the positive and negative electrode terminals 24 and 25 may be formed of a material having higher thermal conductivity than the material forming the other areas B2 and B3 or may be formed of a material having a higher affinity of the refrigerant 27. The second area B2 and the third area B3 outside the first area B1 may have passages different in shape (pattern). For example, the second area B2 may have branch portions 105 formed of branching grooves or protrusions, and the third area B3 may have trunk portions 104 formed of grooves or protrusions continuously extending from the branch portions 105. Alternatively, an absorbing member 79 may have areas different in thickness. For example, as illustrated in FIG. 38, the absorbing member 79 may have a thickness gradually increasing toward the positive and negative electrodes 24 and 25 to improve the cooling performance at the position adjacent to the positive and negative electrode terminals 24 and 25.

Figure 39:
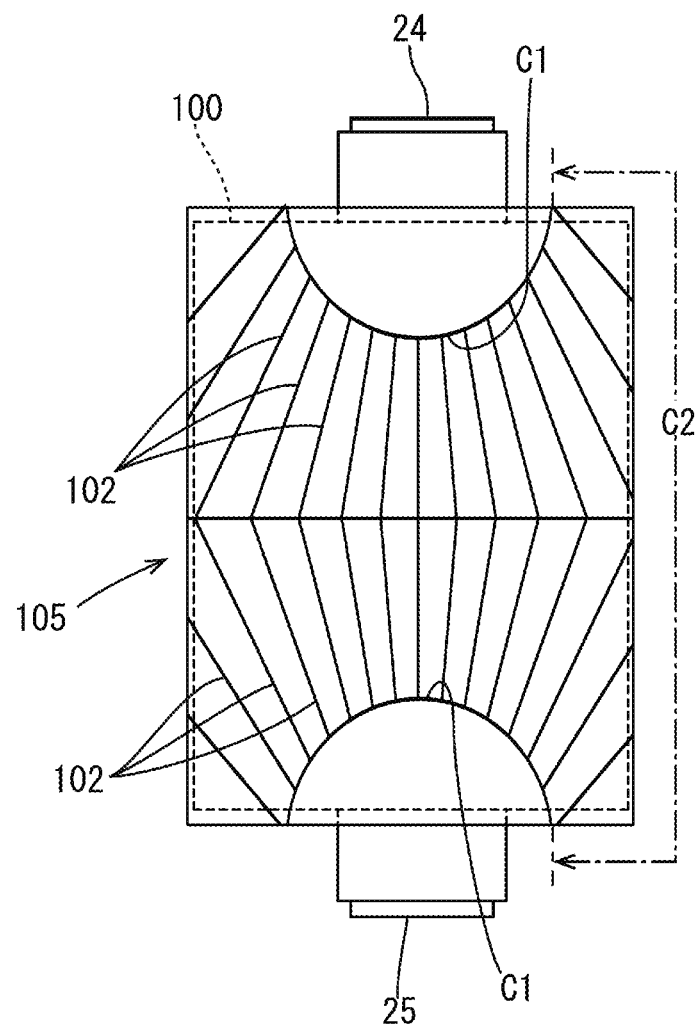
FIG. 39 is a side view indicating a positional relationship between a power storage element and an absorbing member. The power storage element has a positive electrode terminal and a negative electrode terminal at opposite sides.

Alternatively, as illustrated in FIG. 39, a power storage element 100 may have the positive electrode terminal 24 and the negative electrode terminal 25 positioned on the opposite sides. In such a case, an absorbing member 105 has two first areas C1 extending from the respective bases of the positive and negative electrode terminals 24 and 25 over a predetermined area. The first areas C1 that receive heat from the positive and negative terminals 24 and 25 do not have passages formed of grooves or protrusions. A second area C2 outside the first areas C1 may have passages 102 formed of radial grooves or protrusions.

The following effects and advantages are obtained by the above-described embodiments.

The absorbing members 61 to 79 and 105 have the passages 81 to 95, 97, 102, and 10 of the refrigerant 27.

In this configuration, traveling of the refrigerant 27 through the passages 81, 86 to 95, 97, 102, and 103 facilitates circulation of the refrigerant 27, improving the cooling performance.

Furthermore, in the absorbing members 61 to 79 and 105, the area having the passage 81, 86 to 95, 97, 102, or 103 have a different density from other areas.

This configuration allows the passages 81 to 97, 102, and 103 of the refrigerant 27 to be formed by changing the density of portions of the absorbing members 61 to 79, and 105 with a die of a pressing device, simplifying the production process.

Furthermore, the sealing member 26 has the contact portion 30 in contact with the heat source, and the passages 81 to 95, 97, 102, or 10 extend from the area overlapping the contact portion 30 of the absorbing member 61 to 79, and 105 toward the area not overlapping the contact portion 30.

This configuration allows the refrigerant 27 to readily move to the area not overlapping the contact portion 30 of the absorbing member 61 to 79, and 105, improving heat dissipation properties.

The passages 81 to 95, 97, 102, and 103 extend toward at least one of the positive electrode terminal 24 and the negative electrode terminal 25.

This configuration allows the heat of the positive and negative electrode terminals 24 and 25 to be readily transferred to the refrigerant 27, improving heat dissipation properties.

In the absorbing member 61 to 79, or 105, an area near at least one of the positive electrode terminal 24 and the negative electrode terminal 25 is formed of a material different from the material forming the other areas of the absorbing member 61 to 79, or 105.

In this configuration, since the area near the positive electrode terminal 24 or the negative electrode terminal 25 where the temperature tends to be high is formed of a different material, the cooling performance is improved by suitably selecting the material of the absorbing member.

OTHER EMBODIMENTS

The technology disclosed herein is not limited to the embodiments described above and illustrated by the drawings. For example, the following embodiments will be included in the technical scope of the technology disclosed in the specification.

In the cooling member 13 of the first embodiment, the first and second sheet members 28 and 29 are laminate films each including a metal sheet and synthetic resin on both surfaces of the metal sheet. In the cooling member 50 of the second embodiment, the first and second sheet members 52 and 53 each include a metal sheet and synthetic resin on one of the surfaces of the metal sheet. However, the configurations of the first and second sheet members are not limited to these configurations. The first and second sheet members each may be formed of a metal sheet. In such a case, the first sheet member and the second sheet member may be connected to each other in a liquid-tightly closed state by bonding, welding, or brazing, for example. Alternatively, the first and second sheet members each may be formed of a synthetic resin sheet. Examples of the synthetic resin forming the synthetic resin sheet include polyolefin such as polyethylene and polypropylene and polyester such as polybutylene terephthalate and polyethylene terephthalate, and polyamide such as nylon 6, and nylon 6,6. Any synthetic resin may be suitably employed as appropriate.

In the embodiments, one absorbing member 37 is disposed in the sealing member 26, but the configuration is not limited to this. Two or more absorbing members 37 may be disposed in the sealing member 26.

In the embodiments, the absorbing member 37 is disposed over an area equal to or larger than the connection portion of the sealing member 26. However, the absorbing member 37 may be disposed over an area smaller than the connection portion of the sealing member 26.

The cooling member 13 of the embodiment is used in the power storage module 10. However, the application of the cooling member 13 is not limited to this, and the cooling member may be suitably applied to any heat-generating component, such as an electrical junction box and ECU.

In the embodiment, the sealing member 26 is composed of the first sheet member 28 and the second sheet member 29 connected to each other. However, the configuration of the sealing member is not limited to this. The sealing member may be composed of one sheet folded in half and connected at the edges in a liquid-tightly closed state or may be composed of three or more sheets connected to each other in a liquid-tightly closed state.

In the third embodiment, the passage of the refrigerant 27 is formed by partly changing the density of the absorbing member with a pressing machine. However, the refrigerant 27 may be formed without partly changing the density of the absorbing member. The passage may be integrally formed when the absorbing member is formed, for example.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

EXPLANATION OF SYMBOLS

10: power storage module
11: case
12, 100: power storage element
12A: body
13, 50: cooling member
21, 57: heat dissipation portion
24: positive electrode terminal
25: negative electrode terminal
26, 51: sealing member
27: refrigerant
28, 52: first sheet member
29, 53: second sheet member
30: contact portion
37, 54, 61 to 79, 105: absorbing member
39: expansion portion
81, 85 to 95, 97, 102, 103: passage

The invention claimed is:

1. A cooling member comprising:
    a sealing member including a sheet member and defining a liquid tight enclosure, the sealing member configured to change a shape of the sealing member to increase an inner volume of the enclosure;
    a refrigerant enclosed in the enclosure of the sealing member and configured to expand the inner volume of the enclosure by vaporization of the refrigerant; and
    an absorbing member disposed in the enclosure of the sealing member and configured to absorb the refrigerant;
    wherein the sealing member includes an expansion portion at a side end of the sealing member, the expansion portion being composed of a side end of the sheet member bent toward an inner side of the sealing member and being configured to be expanded by the vaporization of the refrigerant to increase the inner volume of the enclosure.

2. The cooling member according to claim 1, wherein the sealing member includes a contact portion to be in contact with a heat source, and
    the expansion portion is disposed in an area of the sealing member at least away from the contact portion.

3. The cooling member according to claim 1, wherein the absorbing member includes a concavity and a convexity defining a passage of the refrigerant in an outer surface of the absorbing member.

4. The cooling member according to claim 3, wherein, in the absorbing member, a density of an area having the passage is different from that of other areas.

5. The cooling member according to claim 3, wherein the sealing member includes a contact portion to be in contact with a heat source, and
    the passage extends from an area of the absorbing member overlapping the contact portion toward an area not overlapping the contact portion.

6. The cooling member according to claim 1, wherein the sealing member includes a contact portion to be in contact with a heat source, and
    the absorbing member is disposed in the sealing member over an area equal to or larger than the contact portion of the sealing member.

7. The cooling member according to claim 1, wherein the sheet member includes a resin layer having laminated resin,
    the sheet member includes two sheet members thermally bonded to each other with the resin layer on an inner side, and
    the sheet members are exposed at an outer surface of the sealing member.

8. The cooling member according to claim 1, wherein the absorbing member allows the refrigerant to move up in the absorbing member such that a height between an uppermost position of the refrigerant determined after an end of the absorbing member arranged in a vertical position is immersed in the refrigerant for 60 seconds and a surface of the refrigerant is 5 mm or more.

9. The cooling member according to claim 1, wherein at least one of the sheet members includes a metal sheet.

10. A power storage module comprising:
    the cooling member according to claim 1;
    a case housing the cooling member; and
    a power storage element housed in the case and being in contact with the cooling member at least a portion of an outer surface of the cooling member.

11. A power storage module comprising:
    the cooling member according to claim 5;
    a case housing the cooling member; and
    a power storage element housed in the case and being in contact with the cooling member at least a portion of an outer surface of the cooling member, wherein
    a positive electrode terminal and a negative electrode terminal protrude from the power storage element, and
    the passage extends toward at least one of the positive electrode terminal and the negative electrode terminal.

12. A power storage module comprising:
    the cooling member according to claim 5;
    a case housing the cooling member; and
    a power storage element housed in the case and being in contact with the cooling member at least a portion of an outer surface of the cooling member, wherein a positive electrode terminal and a negative electrode terminal protrude from an oblong body of the power storage element beyond an outer periphery of the power storage element, and the passage extends from a position adjacent to one of four sides of the body, from which at least one of the positive electrode terminal and the negative electrode terminal does not protrude, toward another one of the four sides.

13. A power storage module comprising:

the cooling member according to claim 1;

a case housing the cooling member; and a power storage element housed in the case and being in contact with the cooling member at least a portion of an outer surface of the cooling member, wherein a positive electrode terminal and a negative electrode terminal protrude from the power storage element, and an area of the absorbing member near at least one of the positive electrode terminal and the negative electrode terminal is formed of a material different from a material forming other areas of the absorbing member.

14. A cooling member comprising:

a sealing member including a sheet member and defining a liquid tight enclosure;

a refrigerant enclosed in the enclosure of the sealing member; and an absorbing member disposed in the enclosure of the sealing member and configured to absorb the refrigerant, wherein the sealing member includes an expansion portion at a side end of the sealing member, the expansion portion being composed of a side end of at least one of the sheet members bent toward an inner side of the sealing member and being configured to be expanded by vaporization of the refrigerant to increase an inner volume of the enclosure of the sealing member.

15. The cooling member according to claim 14, wherein the sealing member includes a contact portion to be in contact with a heat source, and the expansion portion is disposed in an area of the sealing member at least away from the contact portion.

16. A power storage module comprising:

a cooling member, including:

a sealing member including a sheet member and defining a liquid tight enclosure;

a refrigerant enclosed in the enclosure of the sealing member; and an absorbing member disposed in the enclosure of the sealing member and configured to absorb the refrigerant, wherein the absorbing member includes a concavity and a convexity defining a passage of the refrigerant in an outer surface of the absorbing member, and in the absorbing member, a density of an area having the passage is different from that of other areas;

a case housing the cooling member; and a power storage element housed in the case and being in contact with the cooling member at least a portion of an outer surface of the cooling member, wherein a positive electrode terminal and a negative electrode terminal protrude from the power storage element, and an area of the absorbing member near at least one of the positive electrode terminal and the negative electrode terminal is formed of a material different from a material forming other areas of the absorbing member.

17. A power storage module comprising:

the cooling member according to claim 14;

a case housing the cooling member; and a power storage element housed in the case and being in contact with the cooling member at least a portion of an outer surface of the cooling member, wherein a positive electrode terminal and a negative electrode terminal protrude from the power storage element, and an area of the absorbing member near at least one of the positive electrode terminal and the negative electrode terminal is formed of a material different from a material forming other areas of the absorbing member.

\* \* \* \* \*